(12) United States Patent
Kamiya et al.

(10) Patent No.: US 11,010,331 B2
(45) Date of Patent: May 18, 2021

(54) DOCUMENT MANAGEMENT SYSTEM

(71) Applicant: FUJI XEROX CO., LTD., Tokyo (JP)

(72) Inventors: Shigeki Kamiya, Tokyo (JP); Tetsuo Iyoda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 241 days.

(21) Appl. No.: 16/262,951

(22) Filed: Jan. 31, 2019

(65) Prior Publication Data
US 2020/0097443 A1 Mar. 26, 2020

(30) Foreign Application Priority Data
Sep. 21, 2018 (JP) .............................. JP2018-177656

(51) Int. Cl.
*G06F 16/11* (2019.01)
*G06F 16/178* (2019.01)
(Continued)

(52) U.S. Cl.
CPC ........ *G06F 16/122* (2019.01); *G06F 16/1794* (2019.01); *G06F 21/10* (2013.01); *G06F 21/6209* (2013.01)

(58) Field of Classification Search
CPC .. G06F 16/122; G06F 16/1794; G06F 16/211; G06F 21/10; G06F 21/6209
See application file for complete search history.

(56) References Cited

U.S. PATENT DOCUMENTS

| 5,509,074 A | 4/1996 | Choudhury et al. |
| 10,341,353 B1 * | 7/2019 | Yaacoby ................. G06F 21/36 |

(Continued)

FOREIGN PATENT DOCUMENTS

| JP | H07239828 | 9/1995 |
| JP | H09223130 | 8/1997 |

*Primary Examiner* — Christopher J Raab
(74) *Attorney, Agent, or Firm* — JCIPRNET

(57) ABSTRACT

A document management system includes a management device and at least two processing devices. For each of the at least two processing devices, a user to be allowed to register a document by using a corresponding processing device is determined. The management device includes a first storage and an obtaining unit. The first storage stores metadata of a protected document received from any of the at least two processing devices. The obtaining unit obtains information concerning a processing load of each of the at least two processing devices. The at least two processing device include first and second processing devices. The first processing device includes a second storage, a sender, and a receiver. The second storage stores information concerning a user to be allowed to register a document by using the first processing device. Upon receiving a request to register a document from the user, the sender sends the document and identification information concerning the first processing device to the second processing device if a processing load of the first processing device is greater than a threshold. The second processing device is determined based on information concerning a processing load of one or more of the at least two processing devices obtained by the management device. The receiver receives a protected document which is sent from the second processing device based on the identification information. The protected document is generated by processing the document in the second processing device.

7 Claims, 19 Drawing Sheets

(51) Int. Cl.
　　　*G06F 21/10*　　　(2013.01)
　　　*G06F 21/62*　　　(2013.01)

(56) References Cited

U.S. PATENT DOCUMENTS

| | | | |
|---|---|---|---|
| 2006/0206498 A1* | 9/2006 | Fujiwara | G06F 16/38 |
| 2008/0243836 A1* | 10/2008 | Miyoshi | G06F 16/93 |
| 2011/0238682 A1* | 9/2011 | Ootaki | G06F 16/93 |
| | | | 707/758 |
| 2019/0068741 A1* | 2/2019 | Mukai | G06F 3/1222 |

* cited by examiner

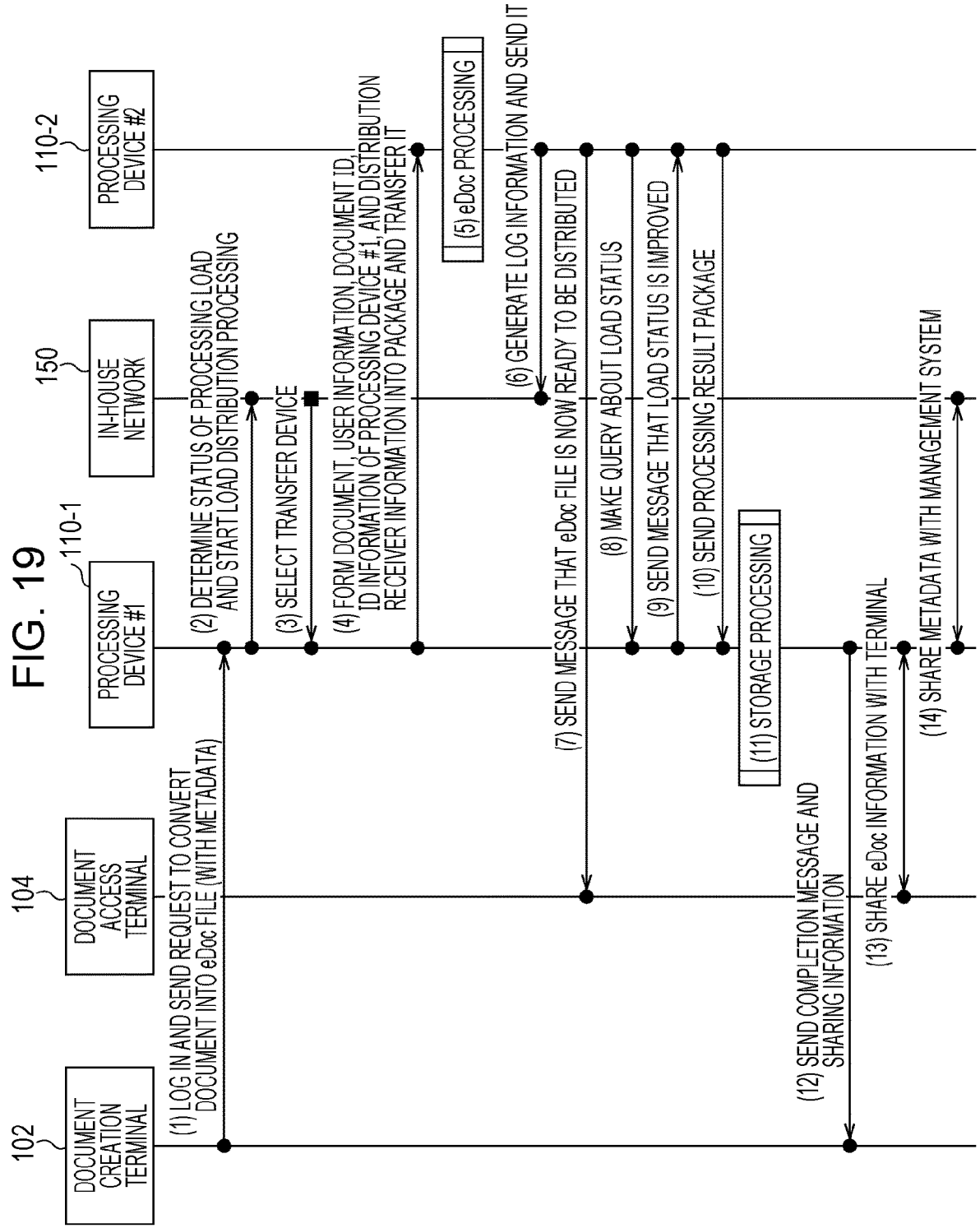

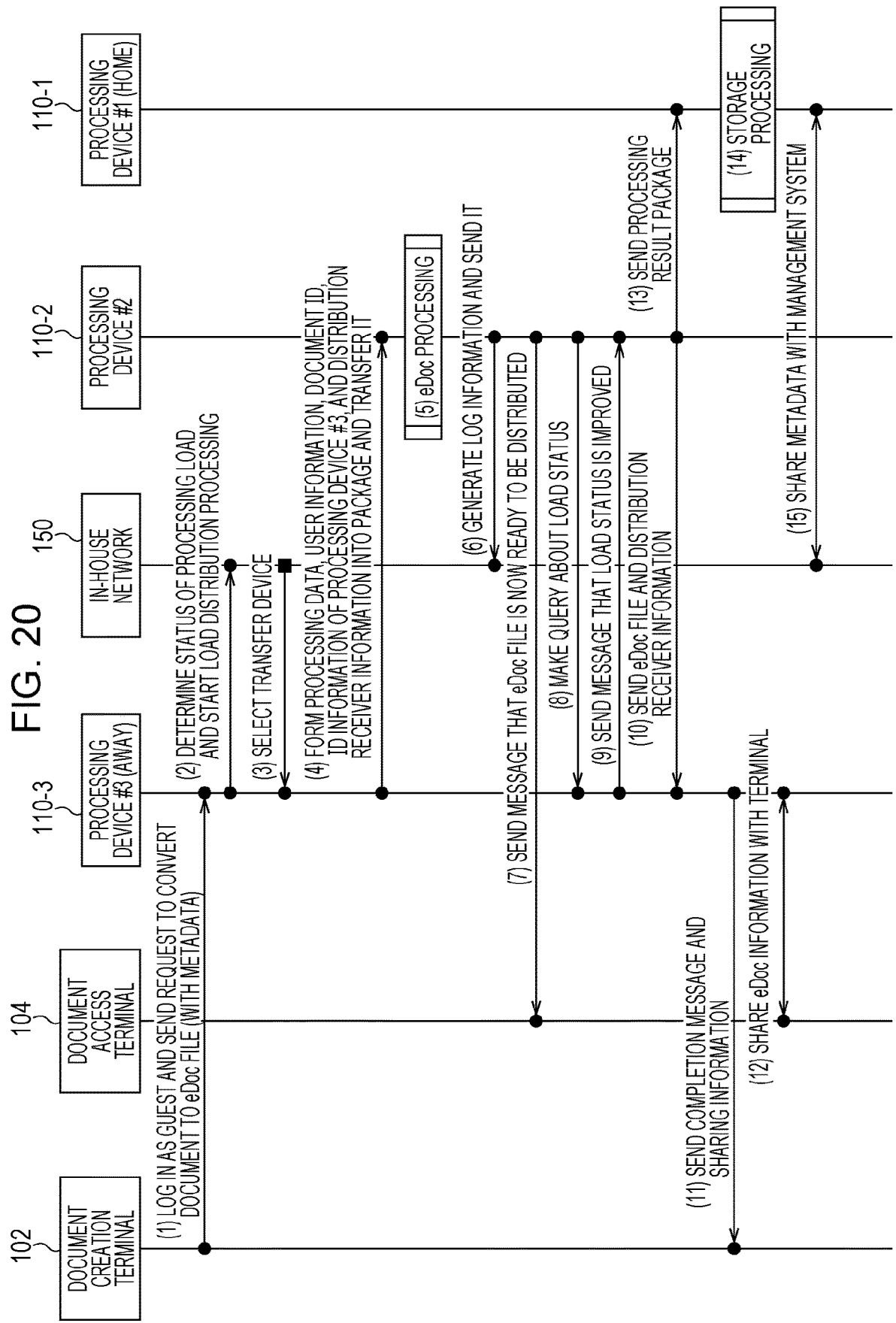

DOCUMENT MANAGEMENT SYSTEM

CROSS-REFERENCE TO RELATED APPLICATIONS

This application is based on and claims priority under 35 USC 119 from Japanese Patent Application No. 2018-177656 filed Sep. 21, 2018.

BACKGROUND

(i) Technical Field

The present disclosure relates to a document management system.

(ii) Related Art

Japanese Unexamined Patent Application Publication No. 07-239828 discloses the following system. A request for a document is received, together with unique user identification information, from each of plural users having a computer with a display or a printer. Then, the requests from the plural users are authenticated in a copyright server. The copyright server then instructs a document server to act according to the authentication result of each request. In response to this instruction, the document server creates a document which is uniquely encoded, compressed, and encrypted for each of the authenticated requests. The document server then transfers a document for each user to a display agent or a printer agent of the corresponding user via a network. The documents are encoded uniquely for the individual users. Each agent then decodes and decompresses the document and makes the document available to access only with a private key provided by the authenticated user to the agent.

Japanese Unexamined Patent Application Publication No. 09-223130 discloses a mechanism to append a document identifier to each document and to maintain the uniqueness of the document identifier.

SUMMARY

Aspects of non-limiting embodiments of the present disclosure relate to a mechanism provided in a system including plural processing devices and a management device, the plural processing devices each encrypting a document and storing a resulting protected document in response to a request to register this document from a user registered in a corresponding processing device, the management device managing metadata concerning protected documents stored in the processing devices. In the mechanism of this system, even when a processing device requested to register a document from a registered user is unable to execute processing for encrypting the document due to its overload status, a protected document generated by encrypting this document is stored in this processing device and metadata concerning this protected document is stored in the management device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document management system including a management device and at least two processing devices. For each of the at least two processing devices, a user to be allowed to register a document by using a corresponding processing device is determined. The management device includes a first storage and an obtaining unit. The first storage stores metadata of a protected document received from any of the at least two processing devices. The obtaining unit obtains information concerning a processing load of each of the at least two processing devices. The at least two processing devices include first and second processing devices. The first processing device includes a second storage, a sender, and a receiver. The second storage stores information concerning a user to be allowed to register a document by using the first processing device. Upon receiving a request to register a document from the user, the sender sends the document and identification information concerning the first processing device to the second processing device if a processing load of the first processing device is greater than a threshold. The second processing device is determined based on information concerning a processing load of one or more of the at least two processing devices obtained by the management device. The receiver receives a protected document which is sent from the second processing device based on the identification information. The protected document is generated by processing the document in the second processing device.

BRIEF DESCRIPTION OF THE DRAWINGS

An exemplary embodiment of the present disclosure will be described in detail based on the following figures, wherein:

FIG. 19 illustrates an example of a processing procedure of load distribution processing in the document management system; and FIG. 20 illustrates another example of a processing procedure of load distribution processing in the document management system.

DETAILED DESCRIPTION

A document management system, which is an exemplary embodiment of the disclosure, to which load distribution processing will be applied will first be described, and then, load distribution processing will be discussed.

Figure 1:
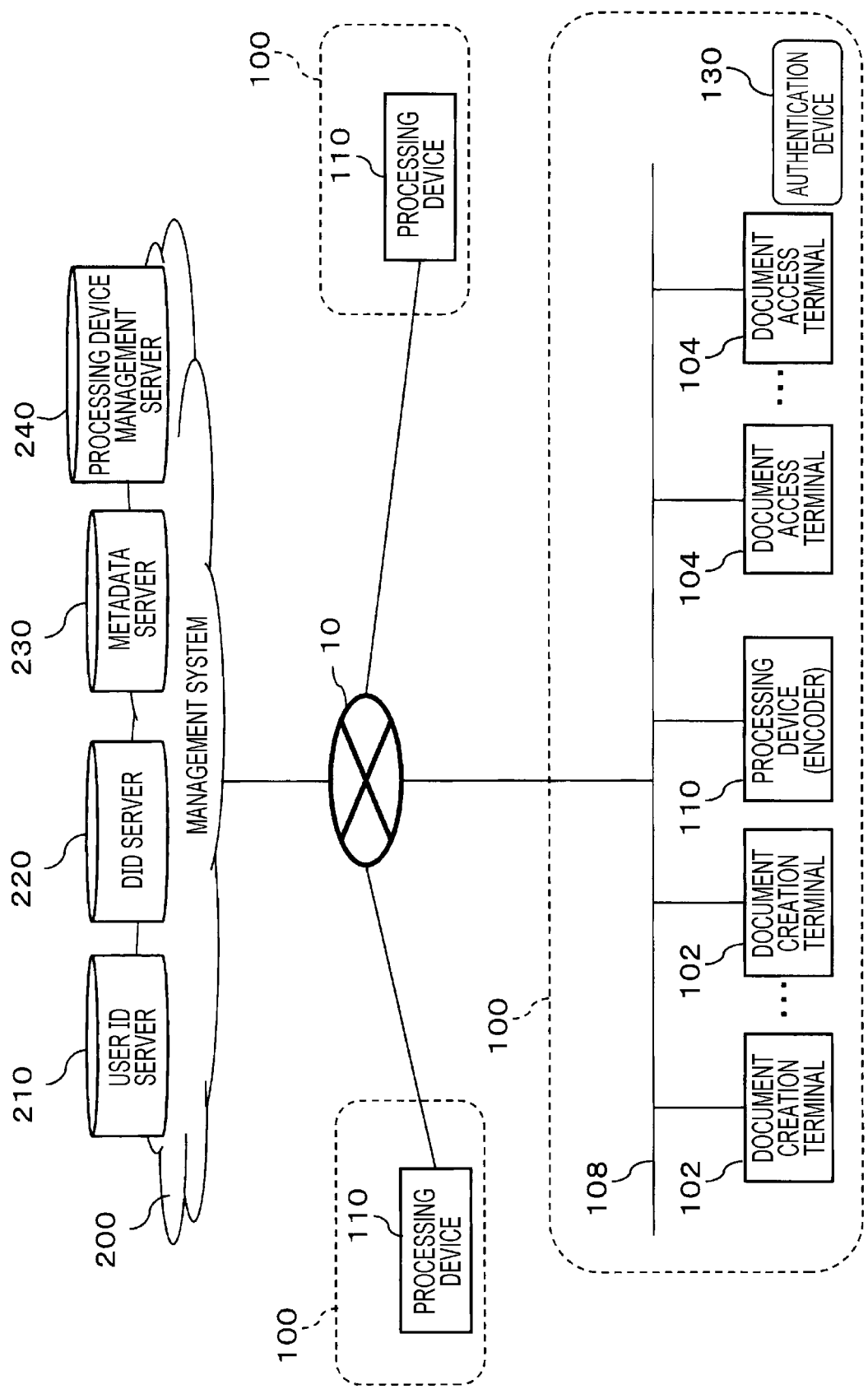
FIG. 1 is a schematic diagram illustrating an example of the configuration of a document management system.

FIG. 1 is a schematic diagram illustrating an example of the document management system.

In the case of a paper document, a user can make a copy of it or hand it to another user as desired, and a user receiving this paper document can read it. The risk of an information leakage is thus extremely high for paper documents.

In contrast, the document management system according to this exemplary embodiment provides environments where digital documents are handled securely so that the risk of a leakage of document information can be decreased. A document is content data that can be distributed as one unit (as one file, for example). Documents are not restricted to a particular type of data. Examples of documents are text data, document data created by word-processing software, spreadsheet data created by spreadsheet software, computer aided design (CAD) data, image data, video data, sound data, multimedia data, page data displayed by using a web browser, and data which is created, edited, and read by a personal computer (PC) and may be printed out.

This document management system includes plural local systems 100 and a management system 200. The management system 200 conducts management concerning the local systems 100, in particular, processing devices 110, which will be discussed later. The management system 200 is able to communicate with the local systems 100 via a wide area network 10, such as the Internet.

The local system 100 includes one or more document creation terminals 102, one or more document access terminals 104, and a processing device 110 that are connected to a local network 108. The local network 108 is a private network disposed in an organization, such as a company. The private network is formed as a local area network (LAN), for example. The local network 108 is protected from the wide area network 10 by a firewall, for example. Basically, one processing device 110 is disposed within one local system 100. If the private network is formed in an organization on a large scale, each network segment forming the private network may be used as a local system 100, and a processing device 110 may be disposed within each network segment serving as a local system 100. For example, a network segment disposed in a department of a certain company is used as the local system 100 for this department, and one processing device 110 is installed in this network segment. In the example shown in FIG. 1, a local system 100 which includes a processing device 110 as the core is formed in each company or each department of a company, and plural local systems 100 are managed by the management system 200.

The document creation terminal 102 is a terminal for creating documents. Examples of the document creation terminal 102 are a desktop PC, a notebook PC, a workstation, a tablet terminal, a smartphone, a multifunction device, a scanner, a fax machine, and a digital camera. In the document creation terminal 102, an application for creating and editing a document is installed. Software for requesting the document management system to distribute a created document is also installed in the document creation terminal 102. This software may be installed in the document creation terminal 102 as a device driver for sending and receiving information to and from the processing device 110, or may alternatively be installed in the document creation terminal 102 by using a web application.

The processing device 110 executes protection processing for converting a document created by the document creation terminal 102 into a protected document (hereinafter may also be called an eDoc file) that can be used in a secure environment provided by the document management system. Protection processing can also be called processing for encoding a document created by the document creation terminal 102 into an eDoc. In this sense, the processing device 110 is a type of encoder. In this protection processing, the processing device 110 converts a document into data in a dedicated format designed for the document management system, and also encrypts the document such that the encrypted document can be decrypted only by users to which the document will be distributed. Regarding the order of format conversion and data encryption, either one of may be executed first.

The processing device 110 creates metadata of a protected document and registers the created metadata in the management system 200, which is the host system. Metadata includes bibliographic items of a protected document, information concerning destinations to which the protected document will be distributed, and information concerning a key to be used by a distribution receiver to decrypt the encrypted document. Metadata includes plural items of data. A corresponding device or user adds, edits, and updates the data in accordance with the function provided by a service in the document management system.

For example, some items of data which forms metadata are set by a user requested the document management system to register a document, and some other items of data are created by the processing device 110. The values of some items of data forming metadata may be set by the management system 200 or a document access terminal 104. The processing device 110 sends a created protected document (eDoc file) to a document access terminal 104 selected by a user as a terminal receiver.

The protected document, that is an eDoc file, is written in a dedicated format converted and encrypted from an original document, and is also called the eDoc body. To read an eDoc file, metadata associated with this eDoc file is required. A combination of an eDoc file and the associated metadata form a complete protected file that can be read. Hereinafter, a combination of an eDoc file and the associated metadata will be called an "eDoc".

The processing device 110 may have a function as an access point of a wireless LAN. This enables the document access terminal 104 to communicate with the processing device 110 by using a wireless LAN.

The document access terminal 104 is used for accessing a protected document (eDoc file). Accessing a document means using a protected document in a mode according to the content of information represented by this document. For example, if a protected document represents information concerning data created by word-processing software or a drawing, accessing the document means that a user reads or views the document displayed by the document access terminal 104. If a protected document represents information concerning sound, accessing the document means that a user listens to sound played back by the document access terminal 104. The document access terminal 104 is constituted by a general-purpose computer, such as a desktop PC, a notebook PC, a workstation, a tablet terminal, or a smartphone, in which a viewer application for accessing a protected document is installed. Alternatively, a read only terminal, such as a digital book terminal, having a function similar to a viewer application, may be used as the document access terminal 104. The viewer application has a function of decrypting an encrypted protected document by using metadata information and a function of decoding data described in a dedicated format for a protected document into data in a readable format. A computer that does not have a viewer application that can be used in the document management system is unable to decode data in a dedicated format into data in a readable format.

In addition to decrypting, decoding, and displaying functions for a protected document, the document access terminal 104 may have a function of receiving processing (editing) performed on a displayed document from a user. The content of a processed (edited) document is different from that of the original protected document. However, the processed (edited) document may be sent from the document access terminal 104 to the processing device 110 and be registered in the document management system so that the processed (edited) document can be re-encoded to a protected document. In this manner, one terminal may have the functions of both of the document creation terminal 102 and the document access terminal 104. In the eDoc, access rights (access right information contained in metadata, which will be discussed later) provided to a user are set. The access rights may include write restrictions and redistribution restrictions for the eDoc. If such restrictions are defined in the access right information set in the eDoc, the document access terminal 104 receives a processing (editing) operation from a user only within the range of the write restrictions and also receives a request to redistribute the processed eDoc to receivers only within the range of the redistribution restrictions.

As a tool for authenticating a user using the document management system, an authentication device 130 which is carried by a user is used. As in an integrated circuit (IC) card, the authentication device 130 contains identification information unique to the user carrying the authentication device 130 and executes data processing for user authentication in response to a request from an external device. The authentication device 130 may alternatively be a mobile terminal, such as a smartphone, having functions similar to those of the above-described IC card. The document access terminal 104 and the document creation terminal 102 have a function of communicating with the authentication device 130 by using a wireless communication protocol, such as near field communication (NFC). The document access terminal 104 and the document creation terminal 102 exchange user authentication information with the authentication device 130 in accordance with a predetermined protocol, and authenticate a user carrying the authentication device 130.

Alternatively, user authentication may be conducted by a server of the document management system, such as the processing device 110 or the management system 200, and the document access terminal 104 and the document creation terminal 102 may only transfer data between the server and the authentication device 130. The document access terminal 104 and the document creation terminal 102 may alternatively have the functions of the authentication device 130.

The management system 200 manages the processing device 110 disposed in each local system 100. The management system 200 also manages metadata of protected documents created by the individual processing devices 110 and provides metadata of a certain protected document to the document access terminal 104 in response to a request. The management system 200 is constituted by one computer or plural computers that can communicate with each other. The management system 200 has functions serving as a user ID server 210, a document ID (DID) server 220, a metadata server 230, and a processing device management server 240.

The user ID server 210 manages information concerning each user using the document management system. Users using the document management system are divided into two levels. One level of a user is a user agreed a contract to use the document management system with the operator of the document management system. The other level of a user is a general user using the document management system to register or access a document in accordance with the contract. A typical mode of the use of the document management system is as follows. The user made a contract (contractor user) is a company. The processing device 110 is installed in the local network 108 of this company. The employees of this company use the document management system as general users via the processing device 110. The user ID server 210 stores and manages information concerning each of the contractor user and general users.

The DID server 220 manages DIDs, which are IDs of protected documents. A DID is appended to a protected document by the processing device 110 created this protected document. The DID server 220 provides a DID issue right and a DID issue limit to the processing device 110. The DID issue limit is a restriction regarding the maximum number of DIDs to be issued. The DID server 220 records DIDs issued by the processing device 110 within the range of the issue right and the issue limit. The DID server 220 thus prevents unauthorized issuing of DIDs and also detects a document having a dishonestly issued DID.

The metadata server 230 stores and manages metadata of each of protected documents (eDoc files) generated by the processing devices 110. In response to a request to send metadata of a protected document (eDoc file) from a user via a document access terminal 104, the metadata server 230 sends the metadata to the document access terminal 104 if the user is an authorized user. The metadata server 230 judges whether a user is an authorized user by determining whether a combination of this user and the document access terminal 104 used for sending the request matches a combination of a distribution receiver user and a distribution receiver document access terminal 104 indicated in distribution receiver information. The distribution receiver information is contained in metadata stored in the metadata server 230 in association with the DID of the eDoc file. The DID of the eDoc file is contained in the request from the user. Details of the distribution receiver information will be discussed later.

The processing device management server 240 manages the status of each processing device 110.

Figure 2:
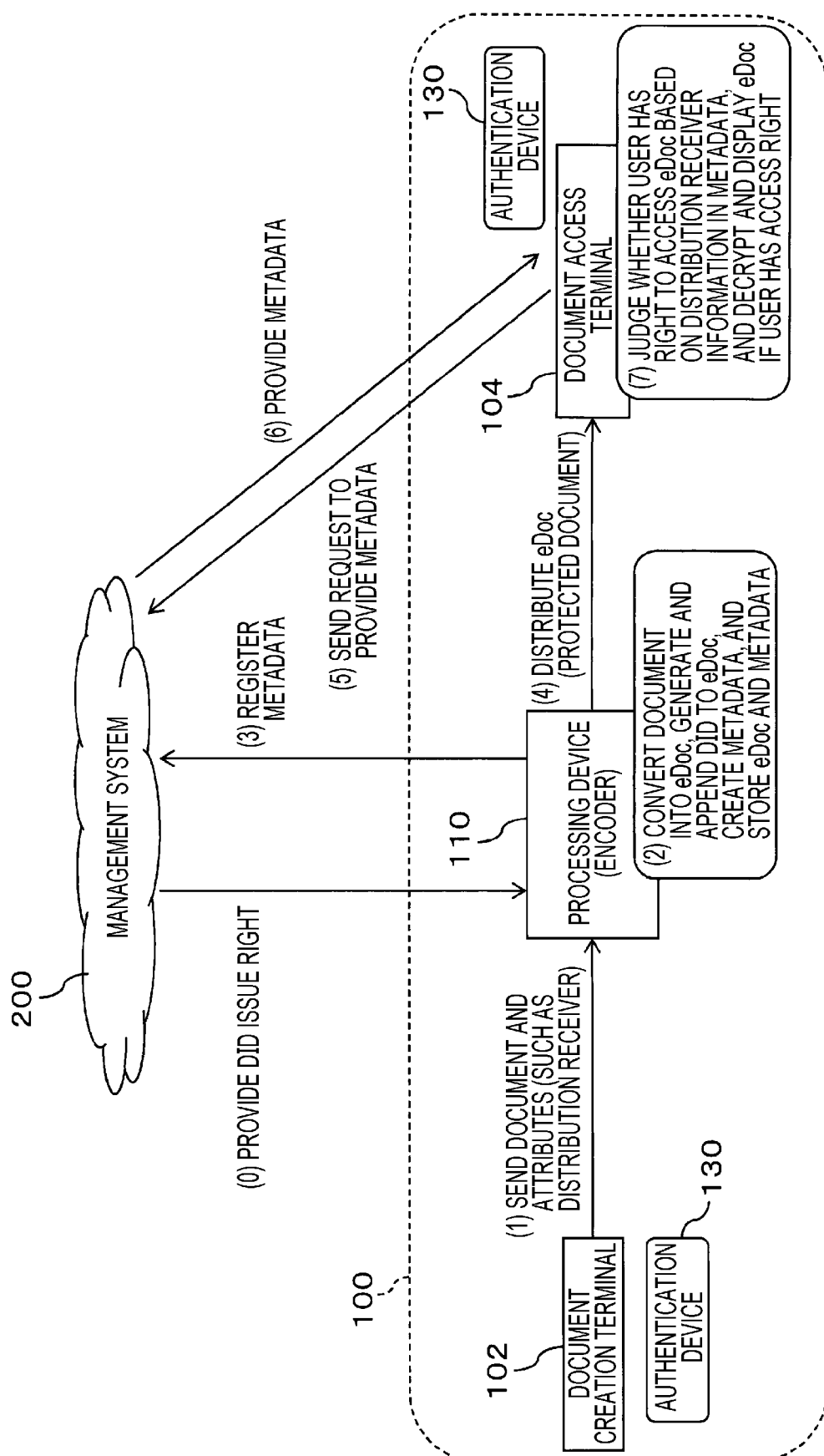
FIG. 2 schematically illustrates document distribution and access in the document management system.

A brief description will be given of the mechanism of the document management system with reference to FIG. 2.

(0) The management system 200 (DID server 220) has already provided a DID issue right and the accompanying DID issue limit (restriction regarding the maximum number of documents (DIDs) that can be issued by the processing device 110) to the processing device 110 of the local system 100. DIDs are not unlimitedly issued and are limited to the number indicated by the DID issue limit. To put it another way, the processing device 110 can append DIDs based on a DID issue right to up to the number of documents indicated by the associated DID issue limit. After the processing device 110 has appended DIDs to up to the maximum number of documents, it receives a new DID issue right and the associated DID issue limit from the management system 200.

(1) To register (distribute) a document in the document management system, a user instructs the document creation terminal 102 to register the document by selecting a "register" button on an application menu, for example. Upon receiving this instruction, the document creation terminal 102 requests the user to conduct user authentication. To conduct user authentication, the user may input a user ID and a password or pass the authentication device 130 over a card reader of the document creation terminal 102. User authentication may be conducted by the document creation terminal 102 or the processing device 110 in which a document will be registered. The user then selects a document from the documents stored in the document creation terminal 102 and instructs it to register the selected document in the document management system.

In response to an instruction to register the selected document from the user, the document creation terminal 102, and more specifically, a register processing program installed in the document creation terminal 102, receives input of some items of attribute data concerning this document to be set by the user. An example of some items of the attribute data to be set by the user is a distribution receiver of this document. As the distribution receiver, the document creation terminal 102 may receive a combination of a user and a document access terminal 104. Information indicating this combination is used when conducting authentication for a user to access the document and the document access terminal 104 used by this user. When the combination of this user and the document access terminal 104 match the combination set as the distribution receiver, the user can access the document.

The document creation terminal 102 combines the items input by the user, such as the distribution receiver, with other items generated by the document creation terminal 102, such as register user information and document creation date, so as to form attribute data. The document creation terminal 102 then sends the attribute data, together with the document data, to the processing device 110. The document creation terminal 102 may contain a driver for converting documents of various formats created by various applications into the uniform format that can be handled by the document access terminal 104. For example, if a document is still image document data, such as data created by word-processing software, a spread sheet, or CAD data, the driver converts such data into a document described in a page description language (PDL), as in a printer driver. If a document is sound data, the driver converts it into data (document) of a specific sound data format that can be handled by the document management system (in particular, the document access terminal 104).

(2) The processing device 110 executes protection processing on the document received from the document creation terminal 102 so as to generate a protected document (eDoc file). More specifically, the processing device 110 encodes the received document into a dedicated format designed for the document management system and encrypts the encoded data by using a generated encryption key so as to generate an eDoc file. In this case, the order of encoding and encryption may be reversed. The processing device 110 appends a unique DID to this eDoc file. The DID includes information that this DID is based on the DID issue right received from the management system 200 (DID issue right key, which will be discussed later) and information that the processing device 110 has appended this DID to the eDoc file (DID issue certificate key, which will be discussed later). An example of the detailed data structure of a DID will be discussed later. The generated DID is integrated within the eDoc file as one of the properties of this file, for example.

The processing device 110 also generates metadata of the generated eDoc file. The metadata indicates the attribute data received from the document creation terminal 102, together with the document. The metadata also indicates the values of attribute items generated by the processing device 110, such as the values of the DID, ID of the processing device 110, encoded date, and encryption key information. The encryption key information included in the metadata is information indicating a key for decrypting the eDoc file. If common-key cryptosystem (symmetric-key algorithm) is used, the encryption key information is information indicating the common key. However, if the common key itself is included in metadata as plaintext, it may be abused by interception, for example. The common key is thus encrypted with a public key of a distribution receiver user and is integrated within metadata as the encryption key information.

The processing device 110 stores the generated eDoc file and the associated metadata in a built-in database.

(3) The processing device 110 sends the generated metadata to the management system 200 and registers it in the management system 200. The metadata server 230 of the management system 200 stores the received metadata.

(4) The processing device 110 distributes the generated eDoc file to the document access terminal 104 selected as a distribution receiver. Push-type distribution or pull-type distribution may be performed to distribute the eDoc file. A combination of push-type distribution and pull-type distribution may alternatively be performed. For example, when the eDoc file is generated, the processing device 110 distributes it to the document access terminal 104 (push-type distribution), and if the document access terminal 104 fails to receive the eDoc file because it is not in operation, it requests the processing device 110 to send the file (pull-type distribution). Distribution of the eDoc file is conducted via the local network 108 within the local system 100.

(5) The document access terminal 104 is unable to read the eDoc file received by the document access terminal 104 because the eDoc file is protected by encryption. To access the eDoc file, a user first conducts user authentication by passing the authentication device 130 over the card reader of the document access terminal 104, and then gives an instruction to access the eDoc file on the screen of the document access terminal 104. Upon receiving this instruction, the document access terminal 104 accesses the management system 200 and requests it to send metadata associated with this eDoc file. This request contains the DID of this eDoc file.

(6) The metadata server 230 of the management system 200 sends the latest version of the metadata to the document access terminal 104 in response to the request.

(7) Upon receiving the metadata from the management system 200, the document access terminal 104 judges whether a combination of this document access terminal 104 and the user currently using this document access terminal 104 (the user is already authenticated with the authentication device 130) is indicated by the distribution receiver information in the metadata. If such a combination is not indicated in the distribution receiver information, the user does not have a right to access this eDoc file by using the document access terminal 104. The document access terminal 104 thus does not open the eDoc file and displays an error message indicating that the user does not have an access right. If such a combination is indicated in the distribution receiver information, the user has a right to access this eDoc file by using the document access terminal 104. The document access terminal 104 thus decrypts the eDoc file by using the encryption key information included in the metadata, and displays the eDoc file on the screen. The document access terminal 104 outputs the eDoc file in a mode according to the information represented by the eDoc file.

The expiration period may be set in metadata. The expiration period may be set by adding a predetermined period or a period specified by a distributor user to the date on which metadata is sent. After the expiration period, the document access terminal 104 is unable to open (decrypt and display) the corresponding eDoc file unless it obtains the metadata from the management system 200 again. If the document access terminal 104 is able to communicate with the processing device 110 or the management system 200, it obtains the latest metadata concerning the eDoc file from the processing device 110 or the management system 200, and judges whether the user has a right to access the eDoc file based on this latest metadata.

After metadata is registered in the management system 200 for the first time, the distribution receiver information and access right information included in the metadata may be changed by a distributor user or a distribution receiver user authorized to change such information, such as a user authorized to edit data. For example, it may be possible that a user selected as a distribution receiver user when an eDoc file has been created and registered will be excluded from distribution receiver users after a certain change is made. In this case, the document access terminal 104 detects such a change from the distribution receiver information included in the latest metadata obtained from the management system 200, and does not display the eDoc file.

An example of the data content of metadata 300 of an eDoc file will be explained below with reference to FIG. 3.

As discussed above, the metadata 300 includes plural items of data. "DID" is a document ID appended by the processing device 110 that has generated the eDoc file associated with the metadata 300. "Document name" is the name or the title of this eDoc file.

"Distributor user ID" is the ID of a user distributed this eDoc file, that is, the ID of a user who has requested the processing device 110 to register the document by using the document creation terminal 102 and distributes the document via the processing device 110. Such a user will be called a distributor user.

"Encoded date" is a date on which the eDoc file is created as a result of the processing device 110 encoding the document received from the document creation terminal 102 (protection processing). "Processing device ID" is identification information concerning the processing device 110 executed the protection processing. "Encryption information" is information concerning encryption conducted when the eDoc file is created and indicates the name of encryption software and software version, and also includes key information indicating the key for decrypting the encrypted file. The key information indicates a decryption key encrypted with a public key of an individual distribution receiver user. "Keyword information" is a list of keywords extracted from the eDoc file (or the original data). The keyword information is used for searching for the eDoc file.

"Distribution receiver information" indicates users and document access terminals selected as distribution receivers of this eDoc file by the distributor user. In the example in FIG. 3, the distribution receiver information indicates, for each distribution receiver user, a user ID and a document access terminal ID (identification information) used by the user. If plural document access terminals 104 to be used for accessing the eDoc file by a user are specified, a combination of the user ID of this user and the IDs of these plural document access terminals 104 is indicated in the distribution receiver information.

In another example, if distribution receiver users may use any of document access terminals 104 selected as distribution receiver terminals to access the eDoc file, the distribution receiver information indicates a list of the IDs of the distribution receiver users and a list of the IDs of the distribution receiver document access terminals 104. For example, as the distribution receiver document access terminals 104, a common terminal for a certain department of a company and a terminal installed in the office or a meeting room of this department may be assumed. The common terminal or the terminal installed in the office of the department may be used by anyone in the department. However, the distributor user knows that this terminal belongs to the department and is less likely to be taken outside the department without permission. Such a terminal is thus legitimate as a distribution receiver for a confidential document. In this manner, the mode of use in which distribution receiver users may use any access terminals 104 selected as distribution receiver terminals is also possible.

"Access right information" indicates rights concerning the use of the eDoc file provided to a distribution receiver user by a distributor user.

"Offline effective period" is information indicating the length of the effective period for the metadata 300. It is now assumed that the metadata of the eDoc file has already been obtained from the management system 200 and cached in the document access terminal 104. In this case, even when the document access terminal 104 is unable to access the management system 200 because it is offline, it may decrypt the eDoc file by using the encryption key information included in the metadata and display it if the period of time elapsed from the date on which the metadata has been acquired is within the offline effective period. If the document access terminal 104 is offline and if the offline effective period has already expired, the document access terminal 104 does not decrypt the eDoc file or display it. If the document access terminal 104 is able to access the management system 200 because it is online, in response to an instruction to access the eDoc file from a user, the document access terminal 104 obtains the latest metadata of the eDoc file from the management system 200 (more specifically, the metadata server 230) and uses it.

"Original data information" is information indicating whether the original data from which the eDoc file is generated (encoded) is stored, and if it is stored, information concerning the storage location of the original data (uniform resource locator (URL), for example). The original data is a document sent from the document creation terminal 102 to the processing device 110 (document which has not been subjected to protection processing) or application data of this document (data created by word-processing software if the document is PDL data), or both of the document and its application data.

"Document acquisition date" is a date on which the document access terminal 104 has acquired the file of the eDoc body data, that is, the eDoc file. "Metadata acquisition date" is a date on which the document access terminal 104 has acquired the latest metadata of the eDoc file sent from the management system 200 and currently cashed in the document access terminal 104. The document acquisition date and the metadata acquisition date are not included in the metadata stored in the management system 200, and are added by the document access terminal 104 to the metadata obtained from the management system 200 for the management in the document access terminal 104.

Figure 3:
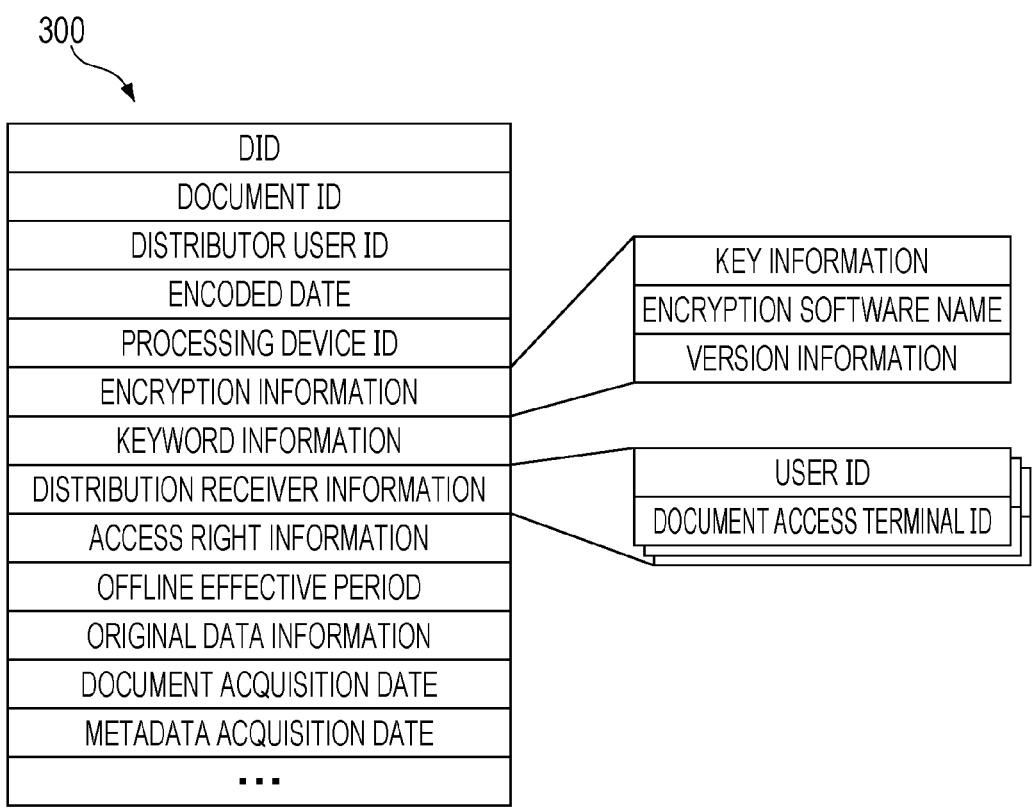
FIG. 3 illustrates an example of the data content of metadata.

Among the items of the metadata 300 shown in FIG. 3, the DID, encoded date, processing ID, encryption information, and keyword information are items generated by the processing device 110. The document name, distributor user ID, distribution receiver information, access right information, offline effective period, and original data information are based on the document and attribute data sent from the document creation terminal 102 to the processing device 110.

An example of the content of data managed by each of the user ID server 210, the DID server 220, the metadata server 230, and the processing device management server 240 of the management system 200 will be described below.

Figure 4:
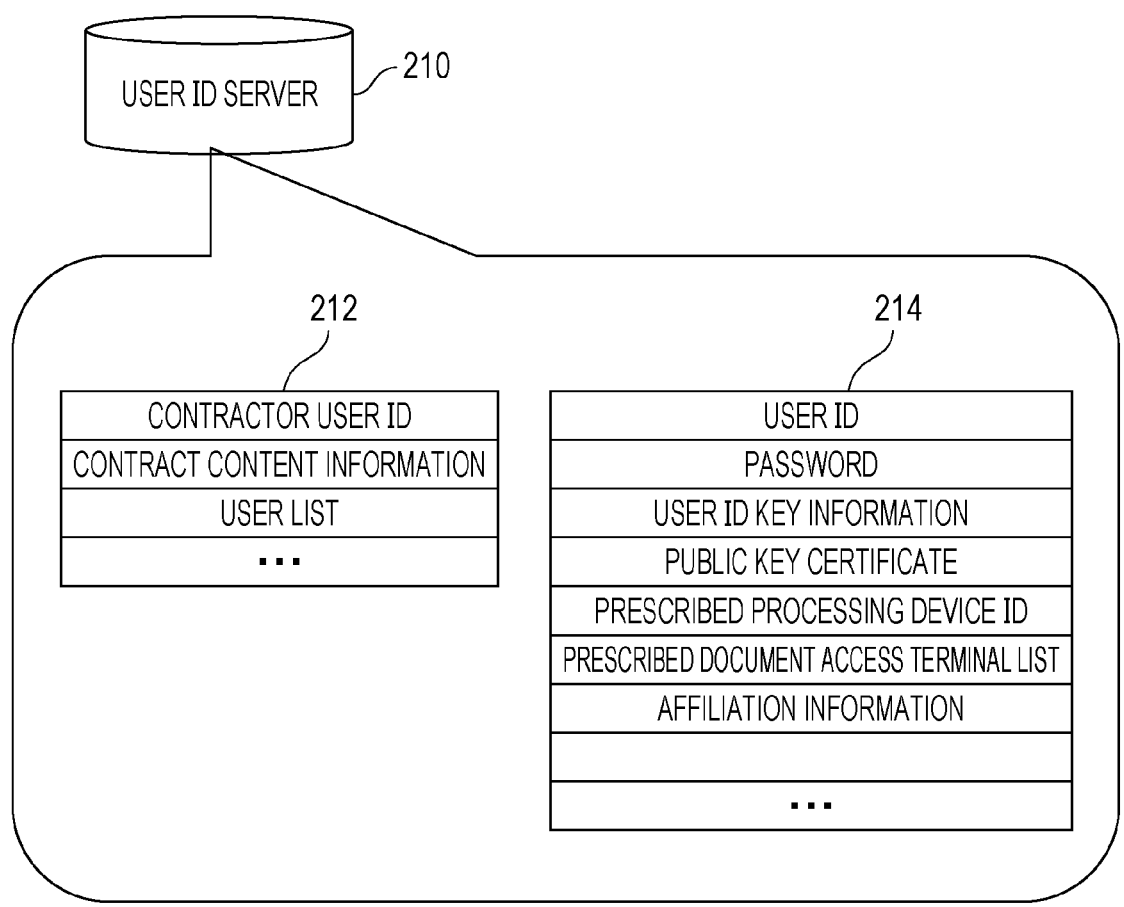
FIG. 4 illustrates an example of the content of data managed by a user ID server.

An example of the content of data managed by the user ID server 210 will first be discussed below with reference to FIG. 4. In the user ID server 210, contractor user data 212 concerning each contractor user and general user data 214 concerning each general user are registered.

The contractor user data 212 includes various items of data indicating a contractor user ID, contract content information, and a user list. The contractor user ID is the identification information of a contractor user (such as an organization or a department within the organization) agreed a contract with the operator of the document management system. The user list is a list of the IDs of general users using this document management system (such as members belonging to an organization, which is the contractor user) in accordance with the contract.

The general user data 214 includes various items of data indicating a general user ID, a password, user ID key information, a public key certificate, a prescribed processing device ID, a prescribed document access terminal list, and affiliation information. The user ID key information is authentication information concerning a certain user to be used by the authentication device 130 of this user. The public key certificate is a digital certificate which certifies the public key of this user. The prescribed processing device ID is the ID of the processing device 110 in which this user is registered. Usually, a user is registered in a processing device 110 installed in the department of the user, and this processing device 110 is the prescribed processing device for this user. The prescribed document access terminal list is a list of the IDs of one or more document access terminals mainly used by the user. The document access terminals included in this list are terminal options to be used when an eDoc file is distributed to the user. The affiliation information is information concerning an organization or a department of the organization to which the user belongs, and indicates the ID of the contractor user of the organization or the department.

An example of the content of data managed by the DID server 220 will be discussed below with reference to FIG. 5.

Figure 5:
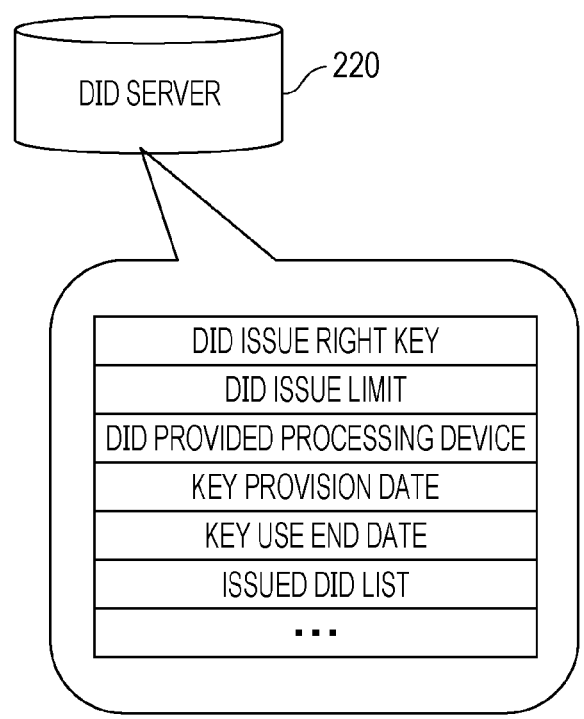
FIG. 5 illustrates an example of the content of data managed by a document ID (DID) server.

As shown in FIG. 5, the DID server 220 stores, for each DID issue right key provided to a processing device 110, items of information indicating a DID issue limit, a DID provided processing device, a key provision date, a key use end date, and an issued DID list.

The DID issue right key is key information (randomly generated character string, for example) which certifies a DID issue right provided by the DID server 220 to the processing device 110. The processing device 110 adds the DID issue right key provided from the DID server 220 to a DID issued by the processing device 110 to certify that this DID has been issued under the legitimate issue right.

The DID issue limit indicates the maximum number of DIDs that can be provided to the processing device 110 together with the DID issue right key. In other words, the DID issue limit indicates the maximum number of documents to which DIDs can be appended. After the processing device 110 has received a pair of a DID issue right key and a DID issue limit from the DID server 220, it can provide a unique DID to up to the maximum number of eDoc files indicated by the DID issue limit.

The DID provided processing device indicates the ID of the processing device 110 to which the DID issue right key and the DID issue limit have been provided. The key provision date is a date on which the DID issue right key is provided to the processing device 110. The key use end date is a date on which the DID provided processing device 110 has finished using the DID issue right key. That is, the key use end date is a date on which the processing device 110 has finished providing DIDs to up to the maximum number of eDoc files indicated by the DID issue limit. If the processing device 110 is allowed to request the DID server 220 to issue a new DID issue right key and a DID issue limit after finishing using the maximum number of DIDs, instead of recording the key use end date of the previous DID issue right key (assumed as a first key), the key provision date of the new DID issue right key may be used as the key use end date of the first key. The issued DID list is a list of DIDs issued by the processing device 110 by using the DID issue right key and of the issued dates. Every time the processing device 110 issues a DID by using the DID issue right key, it informs the DID server 220 that the DID has been issued, and the DID server 220 adds this DID and the issued date to the issued DID list associated with the DID issue right key included in this DID.

The metadata server 230 stores metadata of each eDoc file sent from the individual processing devices 110. The content of metadata to be stored is similar to that shown in FIG. 3. However, among the items of metadata shown in FIG. 3, items only used by the document access terminal 104, such as the document acquisition date and the metadata acquisition date, are not managed by the metadata server 230.

Data managed by the processing device management server 240 will be discussed below with reference to FIG. 6. The processing device management server 240 stores a status history 242 for each processing device 110. The status history 242 includes information concerning a status 244 of this processing device 110 at a time point at which the status history 242 is created or updated (created/updated date) in association with the ID of the processing device 110.

The status 244 of each time point indicates an installation location, a contractor user ID, an administrator name, administrator contact information, a registered user list, software information 246, hardware information 248, a disk space, and security certificate information. The installation location is information indicating the installation location of the processing device 110, such as the address, building name, and floor. The contractor user ID is the ID of the contractor user using the processing device 110. The administrator name is the name of the administrator of the processing device 110. The administrator is a user managing the processing device 110 at the installation location, such as a department, of the processing device 110. The administrator contact information is contact information, such as the email address, of this administrator. The registered user list is a list of the user IDs of users registered in the processing device 110, in other words, the users using the processing device 110 as the prescribed processing device.

The software information 246 includes various items of data indicating the encoding software name, encoding software version, encryption software name, encryption software version, and another software name installed in the processing device 110 and its version. The encoding software is software for converting a document received from the document creation terminal 102 into a dedicated format used in the document management system. The encryption software is software for encrypting a document, such as a document converted into the dedicated format.

The hardware information 248 includes various items of data indicating encoding circuit information, encoding circuit FW version, and manufacturer name of the processing device 110. The encoding circuit information indicates the type of hardware circuit used for encoding processing. The encoding circuit FW version is the version of firmware (FW) of this encoding circuit.

The disk space is a space of an auxiliary storage device, such as a hard disk or a solid state disk, of the processing device 110 at the corresponding time point.

The security certificate information is information for identifying each security certificate installed in the processing device 110 at the corresponding time point. Examples of the security certificate information are a subject identifier, an issuer identifier, and the issued date of a certificate.

The status 244 also includes other items of information, though they are not shown to avoid the complexity. Examples of the other items of information are the font types installed in the processing device 110 (font name list), the address for network communication (IP address, for example), the ID of the auxiliary storage device, such as a hard disk drive, the content of customization for adapting the processing device 110 to processing executed by the backbone system of the organization in which the processing device 110 is installed, and the installation date of an encryption key used by the processing device 110. This encryption key is used for encrypting a communication channel and signatures, for example.

Figure 7:
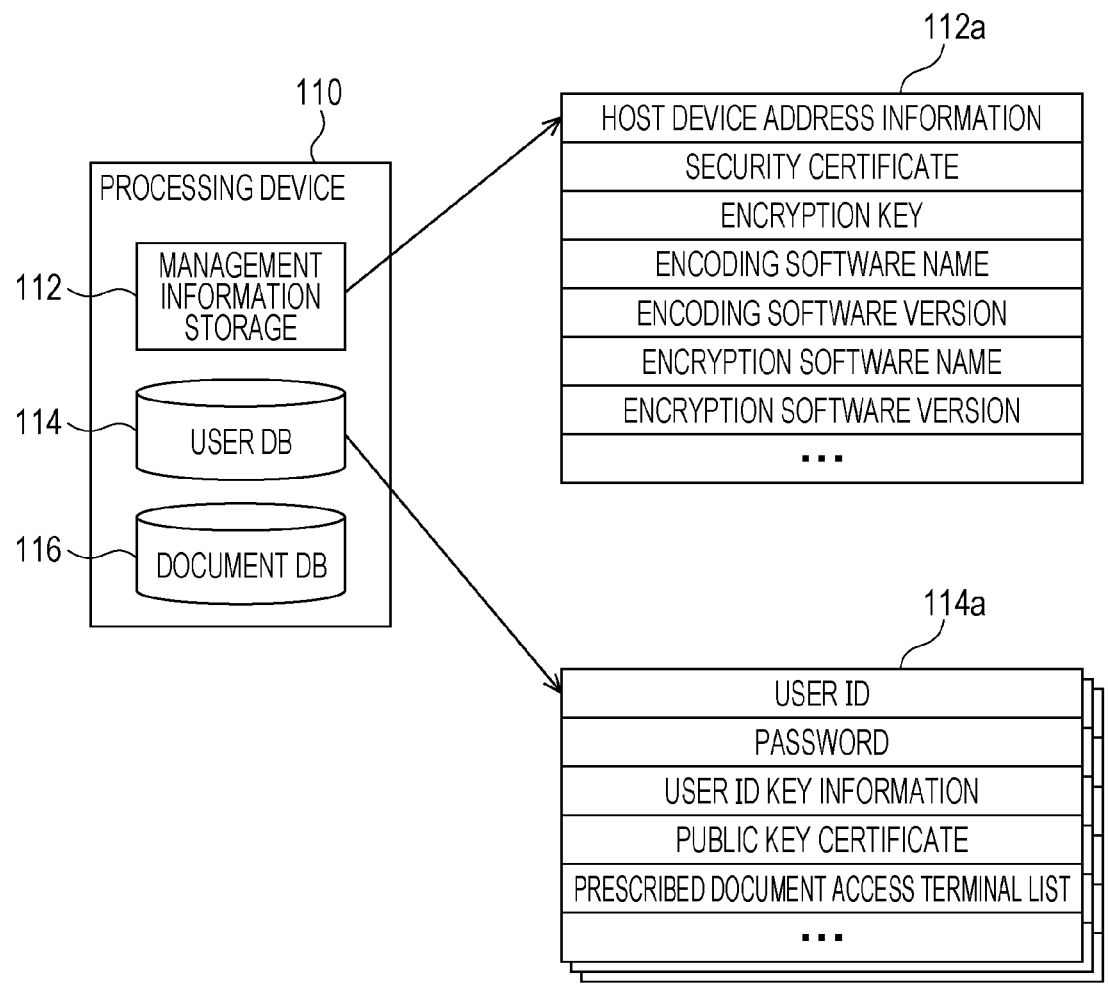
FIG. 7 illustrates an example of the configuration of a processing device and an example of the content of data stored in the processing device.

A group of databases stored in the processing device 110 will be discussed below with reference to FIG. 7. As shown in FIG. 7, the processing device 110 includes a management information storage 112, a user database (DB) 114, and a document DB 116.

In the management information storage 112, management information 112*a* is stored. The management information 112*a* includes various items of data indicating host device address information, a security certificate, an encryption key, an encoding software name, an encoding software version, an encryption software name, and an encryption software version. The host device address information is information concerning the communication address (such as the IP address and URL) of each host device that manages the processing device 110. Examples of the host device are the management system 200 and the user ID server 210, the DID server 220, the metadata server 230, and the processing device management server 240 of the management system 200, or an in-house management system 150 and a local user ID server 152, a local DID server 154, and a local metadata server 156 of the in-house management system 150, which will be discussed later. The security certificate is a digital certificate used by the processing device 110 to conduct secure communication with another device on a network based on a public key infrastructure. The processing device 110 stores the security certificates of host devices which frequently communicate with the processing device 110. The processing device 110 may store the security certificate of each user using the document creation terminal 102 and the document access terminal 104. The encryption key is used by the processing device 110 for encryption and decryption when communicating with another device on a network and for digital signatures (or for generating certificate information similar to digital signatures). The encryption key is constituted by a pair of a private key and a public key provided to the processing device 110 based on the public key infrastructure, for example. The encoding software name is the name of encoding software installed in the processing device 110 to convert a document into a dedicated format. The encryption software name is the name of software installed in the processing device 110 to encrypt the document.

In the user DB 114, user information 114*a* concerning each user registered in the processing device 110 (in other words, users using the processing device 110 as the prescribed processing device) is stored. The user information 114*a* concerning each registered user includes various items of data, such as a user ID, a password, user ID key information, a public key certificate, and a prescribed document access terminal list. The content of these items of data is similar to that of the counterparts of the general user data 214 stored the user ID server 210 shown in FIG. 4.

In the document DB 116, eDoc files generated by the processing device 110 and the associated items of metadata are stored. Each eDoc file and metadata are appended with a DID and can thus be associated with each other. In the document DB 116, the original data of an eDoc file (or original data received from the document creation terminal 102) may be registered in association with the DID of the eDoc file.

For each user using the document creation terminal 102 and the document access terminal 104, the document creation terminal 102 and the document access terminal 104 store authentication information (user ID and password) concerning a corresponding user, prescribed processing device ID, address information concerning the prescribed processing device, address information of a host device (such as the management system 200 or the in-house management system 150), security certificates of the processing device 110 and the host device, and encryption key used for encrypting a communication channel.

(Processing Procedure in Document Management System)

When a processing device 110 is installed on the local network 108, maintenance staff conducting maintenance of the processing device 110 registers in the processing device 110 information concerning users using the processing device 110 and information concerning document creation terminals 102 and document access terminals 104 that may be used by these users. The registered user information is also transferred to and registered in a host device, such as the user ID server 210 (or the local user ID server 152, which will be discussed later). After the processing device 110 is installed on the local network 108, if a new user is added or a user among the users using the processing device 110 is deleted, the maintenance staff registers information concerning the new user and deletes information concerning the deleted user. Information concerning such addition or deletion of users is also supplied to the host device, such as the user ID server 210, and information stored in the host device is accordingly updated. The maintenance staff also installs software for requesting the processing device 110 to register and distribute a document in each document creation terminal 102. This software may be installed as a device driver for communicating with the processing device 110. The maintenance staff also registers information for communicating with the processing device 110 (such as the device name, communication address, and wireless access settings) in each document access terminal 104.

A processing procedure for registering and distributing a document in the document management system will be described below with reference to FIG. 8.

(1)-1 When a distributor user instructs the document creation terminal 102 to register a document, the document creation terminal 102 displays a screen for instructing the user to input login authentication information (such as a user ID and a password). When the user has input the login authentication information in response to the instruction, the document creation terminal 102 sends the login authentication information to the processing device 110 via the local network 108.

(1)-2 Upon receiving the login authentication information, the processing device 110 conducts user authentication by using the login authentication information. It is assumed that user authentication has succeeded, that is, the user is authenticated as an authorized user. In FIG. 8, user authentication is conducted by using the login ID and a password. However, if the document creation terminal 102 is able to communicate with the authentication device 130, login authentication may be conducted by using the authentication device 130.

(2)-1 When login authentication has succeeded, the user selects a document to be registered in the document management system and to be distributed to another user from among documents stored in the document creation terminal 102, and instructs the processing device 110 to register the selected document. Then, software, which is an interface with the processing device 110, such as a device driver, is started and receives input of attribute data concerning the selected document. The document creation terminal 102 then sends the received attribute data and the selected document to the processing device 110.

Figure 9:
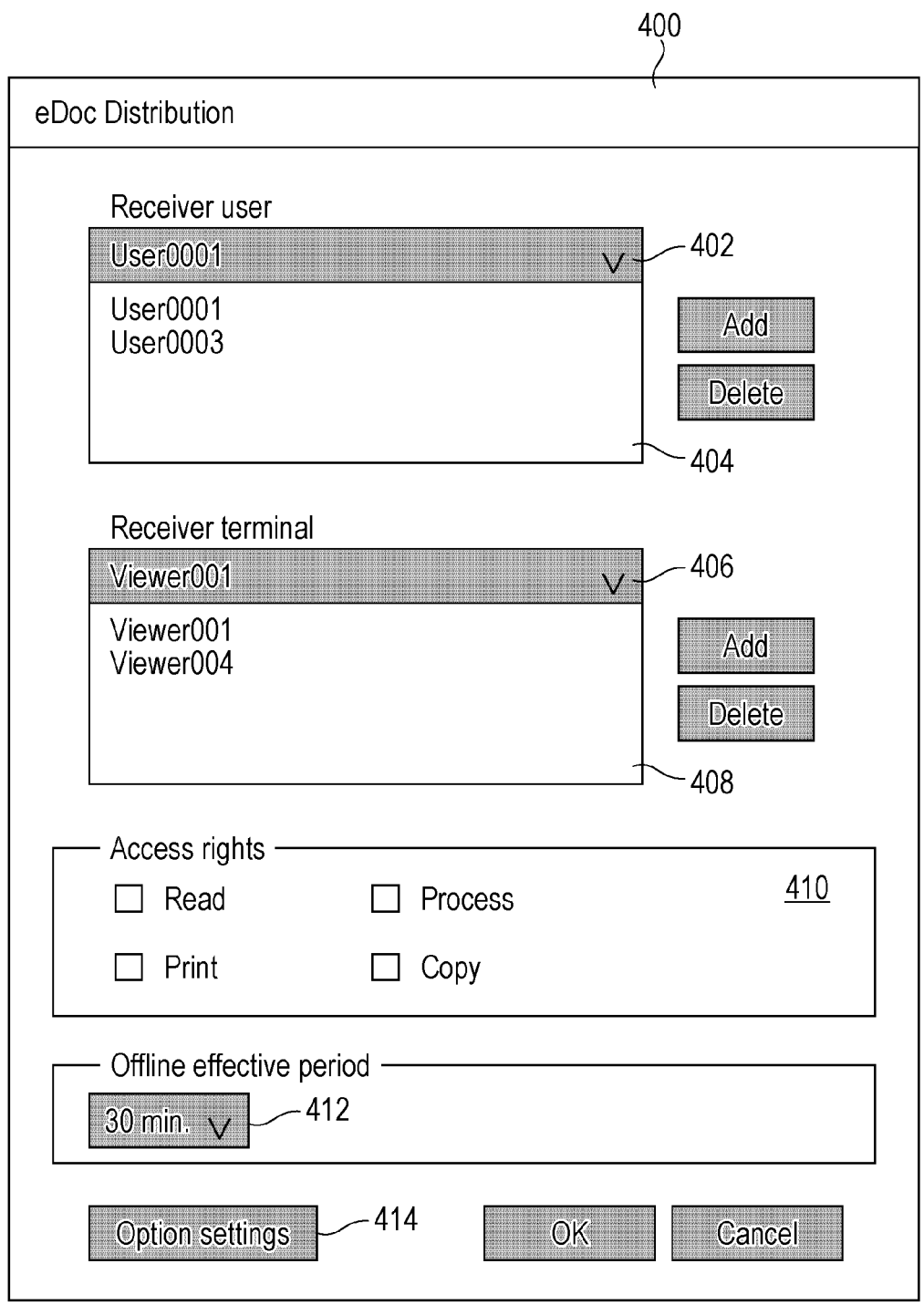
FIG. 9 illustrates an example of an input screen for attribute data.

FIG. 9 illustrates an example of an input screen 400 for the attribute data. The input screen 400 includes a receiver user selection menu 402, a receiver user list field 404, a receiver terminal selection menu 406, a receiver terminal list field 408, an access right setting field 410, an offline effective period menu 412, and an option setting call button 414.

The receiver user selection menu 402 is a pull-down menu for listing options of users to which this document may be distributed. Users that can be options of distribution receivers are users registered in the processing device 110. A list of the user IDs and user names of these users can be obtained from the processing device 110. Alternatively, the document creation terminal 102 may obtain a user list from the local user ID server 152 (see FIG. 12) which manages information concerning users belonging to a certain organization and using the document management system. This enables the distributor user to select a user registered in another processing device 110 within the organization as a distribution receiver user. In this case, in the receiver user selection menu 402, the users are displayed in a mode such that the distributor user can distinguish the processing devices 110 in which the individual users are registered from each other. For example, the users may be displayed in different colors or fonts according to the processing device 110. Alternatively, the receiver user selection menu 402 may be formed in a hierarchical structure. When the distributor user first selects a processing device 110, a list of users registered in this processing device 110 is called. The distributor user then selects a user from this list. In the receiver user list field 404, a list of users selected by the distributor user is displayed. When the distributor user selects a user in the receiver user selection menu 402 and presses an "add" button on the right side, the user ID or the user name of this user is added to the receiver user list field 404. When the distributor user selects a user in the receiver user selection menu 402 and presses a "delete" button on the right side, this user is deleted from the receiver user list field 404. That is, the document is not distributed to this user.

The receiver terminal selection menu 406 is a pull-down menu for listing options of document access terminals (viewers) 104 to which the document may be distributed. Document access terminals 104 that can be options of distribution receivers are terminals registered in the processing device 110. A list of the terminal IDs and terminal names of these document access terminals 104 can be obtained from the processing device 110. Alternatively, the processing device 110 or the local user ID server 152 (see FIG. 12) may have a list of document access terminals 104 in an organization registered in the document management system, and the document creation terminal 102 may present this list to the distributor user. This enables the distributor user to select the document access terminal 104 of a user registered in another processing device 110 within the same organization. As in the receiver user list field 404, in the receiver terminal list field 408, a list of document access terminals 104 selected by the distributor user in the receiver terminal selection menu 406 is displayed.

The distributor user may be able to select a document access terminal 104 for each receiver user. In this case, every time the distributor user has selected a receiver user in the receiver user list field 404, the document creation terminal 102 obtains a list of prescribed document access terminals 104 of the selected receiver user from the processing device 110 (or the local user ID server 152 or the user ID server 210), and sets this list in the receiver terminal selection menu 406. If the distributor user does not select a document access terminal 104 for a receiver user, a specific document access terminal 104 in the above-described list (terminal in the head of the list, for example) is automatically selected as a receiver terminal.

The access right setting field 410 is a field for setting access rights (usage rights) to be provided to a receiver user concerning the document. In FIG. 9, check boxes for four types of access rights, that is, read, process (edit), print, and copy, are indicated. The distributor user checks check boxes for the types of access rights to be provided to a receiver user.

The offline effective period menu 412 is a pull-down menu for listing options of the offline effective period to be set for the document. The distributor user selects the offline effective period to be set for the document to be distributed from among several options indicated in the offline effective period menu 412.

Figure 10:
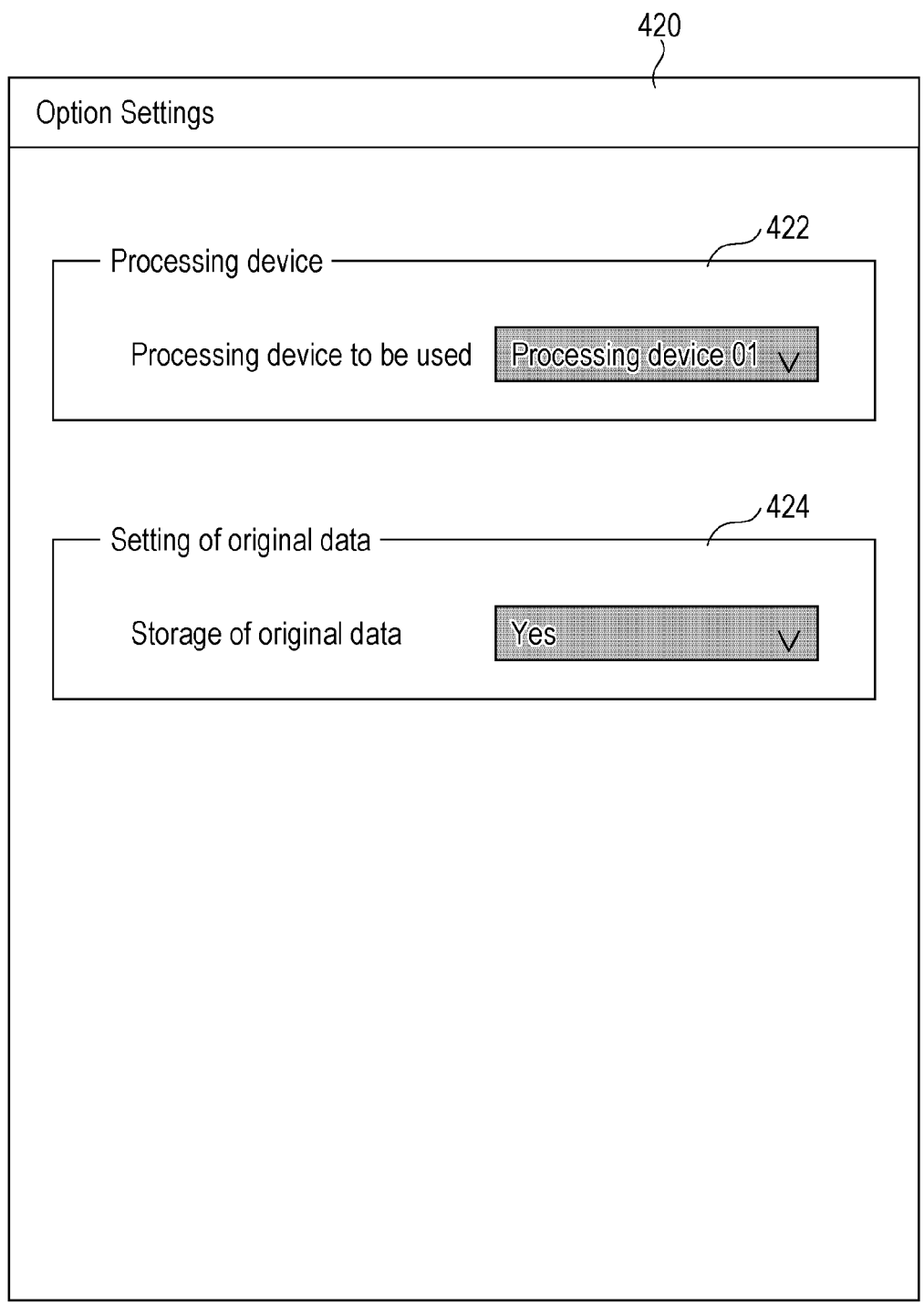
FIG. 10 illustrates an example of an option setting screen.

When the option setting call button 414 is pressed, the document creation terminal 102 displays an option setting screen 420, such as that shown in FIG. 10. The option setting screen 420 includes a processing device selection field 422 and an original data setting field 424. The processing device selection field 422 includes a pull-down menu for listing options of processing devices 110 to which the document will be sent. This pull-down menu includes a list of processing devices 110 that can be selected by using the document creation terminal 102. The processing devices 110 included in this list are those disposed within the local system 100 in which the document creation terminal 102 is installed. Basically, one processing device 110 is disposed within one local system 100. However, plural processing devices 110 may be disposed, as discussed above. Processing devices 110 in another local system 100 within the same organization may be included in this list. In the original data setting field 424, a pull-down menu for selecting whether the original data of the eDoc file will be stored in the processing device 110 is displayed.

The attribute data sent from the document creation terminal 102 to the processing device 110 in step (2)-1 includes distribution receiver information (user list and document access terminal list), access right information, offline effective period information, and original data information set on the screens, such as the input screen 400 and the setting screen 420.

Figure 8:
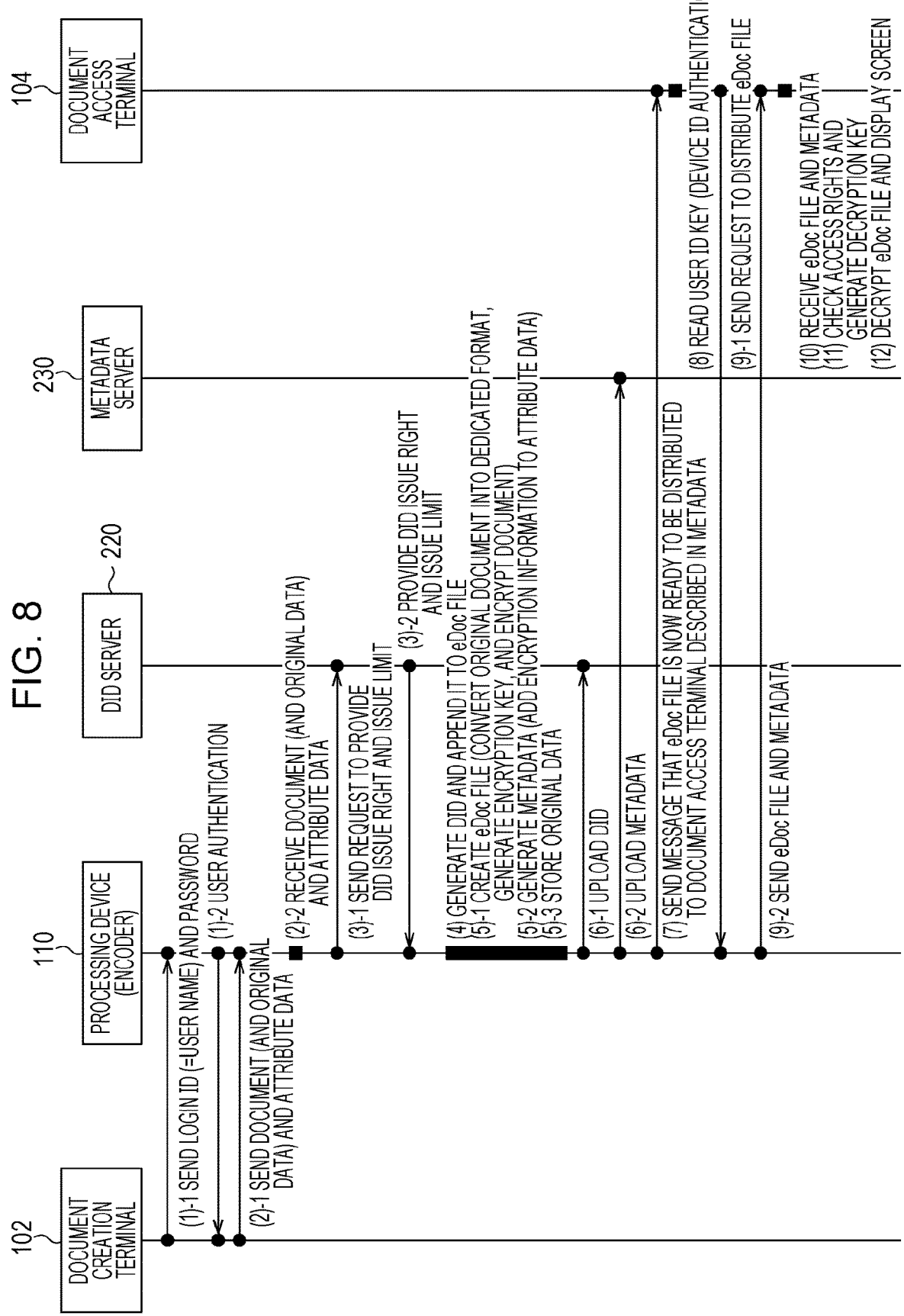
FIG. 8 illustrates a processing procedure for registering, distributing, and accessing a document in the document management system.

A description will be returned to FIG. 8.

(2)-2 The processing device 110 receives the document (also be called the subject document) and the attribute data from the document creation terminal 102.

(3)-1 If the processing device 110 has not received a DID issue right and a DID issue limit (or if the processing device 110 has received them and already used the maximum number of DIDs), it requests the DID server 220 of the management system 200 to send a new DID issue right and a DID issue limit. If the processing device 110 still has a DID that has not been issued, it skips this step and proceeds to step (4).

(3)-2 The DID server 220 sends a new DID issue right and a DID issue limit to the processing device 110 in response to the request from the processing device 110.

(4) The processing device 110 issues a DID by using the DID issue right provided from the DID server 220 and appends the issued DID to an eDoc file to be generated from the subject document.

(5)-1 The processing device 110 generates an encryption key for encrypting the subject document by using random numbers, for example. The processing device 110 then converts the subject document into an eDoc file. More specifically, the processing device 110 encodes the subject document into a dedicated format designed for the document management system and encrypts the encoded document with the encryption key, thereby generating an eDoc file. The generated eDoc file contains the DID issued in step (4).

(5)-2 The processing device 110 generates metadata of the eDoc file. More specifically, the processing device 110 generates metadata (see FIG. 3) by adding the DID, encoded date, the ID of the processing device 110, and encryption information to the attribute data received from the document creation terminal 102. The encryption information includes, for each distribution receiver user, key information generated by encrypting the encryption key with a public key of a distribution receiver user.

(5)-3 Upon receiving an instruction to store the original data from the document creation terminal 102, the processing device 110 stores the document (or application data of the document) received from the document creation terminal 102.

(6)-1 The processing device 110 uploads the DID issued in step (4) to the DID server 220. The DID server 220 stores this DID.

(6)-2 The processing device 110 uploads the metadata generated in step (5)-2 to the metadata server 230. The metadata server 230 stores this metadata.

(7) The processing device 110 sends a message that the eDoc file is now ready to be distributed to each of the receiver document access terminals 104. This message includes information concerning the DID and the document name of the eDoc file. This message may also include a thumbnail image of a representative page (predetermined page, such as the head page) of the eDoc file.

Figure 11:
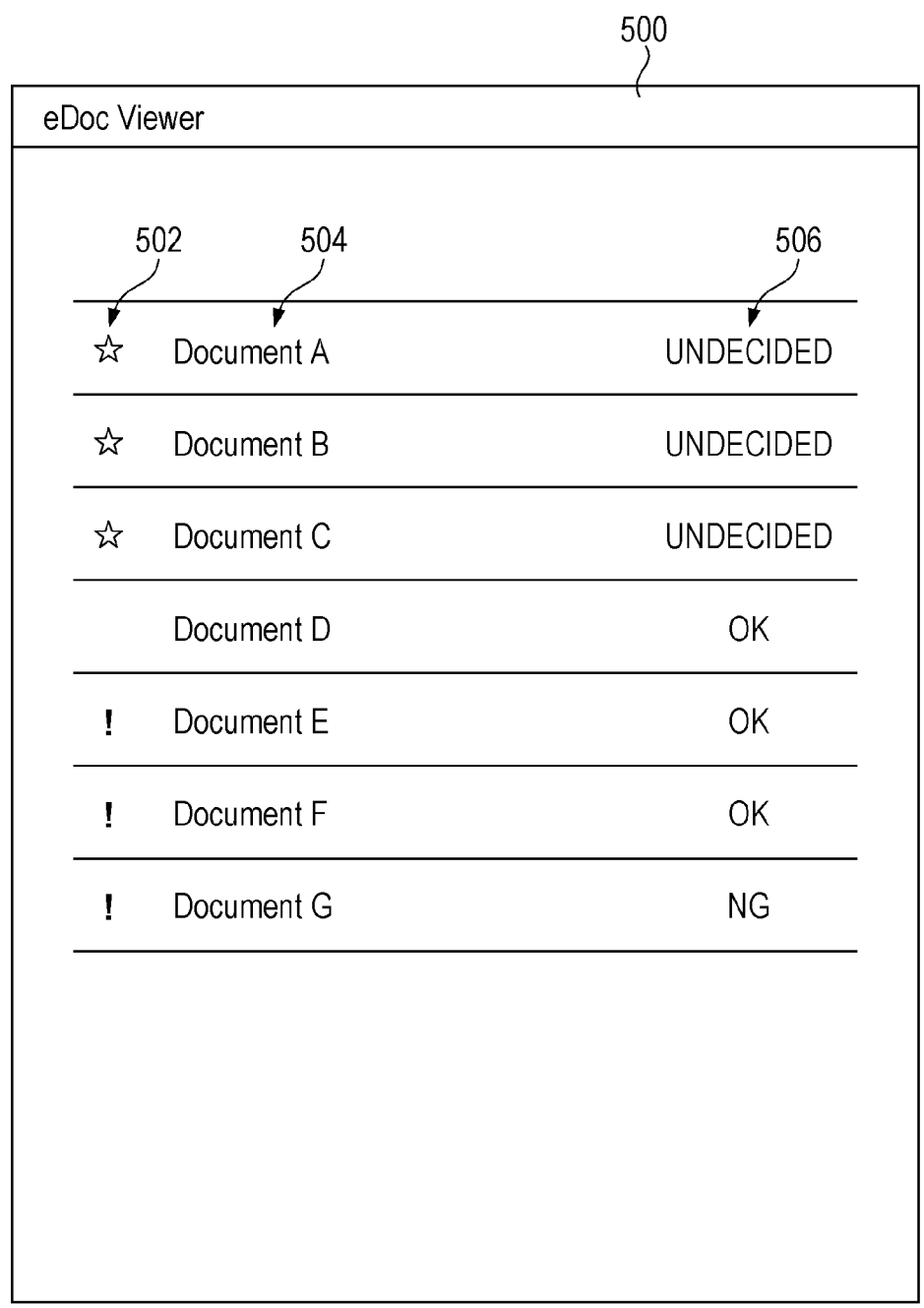
FIG. 11 illustrates an example of a list screen.

A user (also called a viewer) using the document access terminal 104 passes the authentication device 130 of the user over the card reader of the document access terminal 104 so as to conduct user authentication. The document access terminal 104 displays a list screen 500 of a list of eDoc files distributed to the document access terminal 104. FIG. 11 illustrates an example of the list screen 500. The list screen 500 includes a notification mark 502, a document name 504, and viewable/non-viewable information 506 for each eDoc file. The notification mark 502 is used for notifying the viewer of the status of the eDoc file. The status of the eDoc file is represented by "newly arrived" (indicated by the star mark in FIG. 11), "normal" (no mark in FIG. 11), and "expired" (indicated by the exclamation mark in FIG. 11). A document with the star mark ("newly arrived") has been received from the processing device 110 and has not been opened. For a document with the exclamation mark ("expired"), the access effective period has expired. Such a document is not viewable even though the eDoc file is stored in the document access terminal 104 unless the latest metadata of this eDoc file is obtained from the processing device 110 or the management system 200. A document without any mark ("normal") is viewable even if the document access terminal 104 is offline and is unable to communicate with the processing device 110 or the management system 200 because metadata of this document has not expired and stored (cached) in the document access terminal 104. The viewable/non-viewable information 506 indicates whether a combination of the document access terminal 104 and the user (authenticated by using the authentication device 130) using the document access terminal 104 matches a combination of a receiver user and a receiver document access terminal 104 indicated by the metadata of the eDoc file cached in the document access terminal 104. If the two combinations match each other, the eDoc file is viewable (indicated by "OK" in FIG. 11). If the two combinations do not match each other, the eDoc file is not viewable (indicated by "NG" in FIG. 11). Regarding a document for which the eDoc file and metadata have not been received from the processing device 110 although they are ready, the document access terminal 104 does not have any information to make the above-described judgement. The viewable/non-viewable information 506 for such a document indicates "undecided" in FIG. 11. In the example in FIG. 11, the top three documents are newly arrived, and the eDoc body (eDoc file and metadata) has not been obtained, and the viewable/non-viewable information 506 for these files indicates "undecided".

The viewer selects a document on the list screen 500 shown in FIG. 11 by touching it, for example. It is now assumed that a newly arrived document indicated by the star mark has been selected.

A description will be returned to FIG. 8.

(8) The document access terminal 104 does not have the eDoc file and metadata of the selected document and is thus required to obtain them from the processing device 110. The document access terminal 104 first sends a user ID key, which is authentication information, acquired from the authentication device 130 of the viewer to the processing device 110 on the local network 108 to which the document access terminal 104 is connecting. The processing device 110 then conducts user authentication to check whether the user ID key certifies a user registered in the processing device 110. It is assumed that user authentication has succeeded. If the user ID key received from the document access terminal 104 does not certify any user registered in the processing device 110, the processing device 110 may send the user ID key to a host device engaged in user authentication (user ID server 210 or local user ID server 152) and request it to conduct user authentication.

(9)-1 After user authentication has succeeded, the document access terminal 104 sends a request to distribute the eDoc file selected by the viewer to the processing device 110. The request includes the DID of this file.

(9)-2 The processing device 110 sends the eDoc file and metadata associated with the DID contained in the request to the document access terminal 104.

(10) The document access terminal 104 receives the eDoc file and metadata sent from the processing device 110 and stores (caches) them.

(11) The document access terminal 104 judges whether a combination of the document access terminal 104 and the viewer currently using the document access terminal 104 matches one of the combinations of receiver users and receiver terminals indicated by the distribution receiver information (see FIG. 3) included in the metadata. If the combination of the document access terminal 104 and the viewer is not found, the viewer is unable to access the eDoc file by using this document access terminal 104. In this case, the document access terminal 104 displays an error message that the eDoc file is not viewable by this document access terminal 104. The document access terminal 104 may delete this eDoc file and the associated metadata. If the above-described combination is found, the document access terminal 104 allows the viewer to access the eDoc file. In this case, the document access terminal 104 extracts the encrypted key corresponding to this viewer contained in the encryption information in the metadata, and decrypts this encrypted key with the private key (stored in the authentication device 130) of the viewer, thereby reproducing the decryption key for decrypting the eDoc file.

(12) The document access terminal 104 decrypts the eDoc file with the reproduced decryption key so as to reproduce the document, and outputs the document by displaying it on the screen, for example. The document access terminal 104 also judges whether to accept an operation instruction for the document from the viewer, based on the access right information included in the metadata. Basically, the document access terminal 104 does not store the decrypted document in a file. That is, after the eDoc file is viewed, the document access terminal 104 does not store the decrypted document though it stores the eDoc file and metadata in the non-volatile storage device of the document access terminal 104.

Another example of the document management system will be described below with reference to FIG. 12. In the example shown in FIG. 12, plural local systems 100 are disposed within an organization in-house network, which is a private network of an organization, such as a company. Within the organization in-house network, an in-house management system 150 is disposed. The in-house management system 150 manages part of operations and information managed by the document management system 200. That is, the in-house management system 150 manages operations related to the organization and information required for the operations. More specifically, the management system 200, which is operated by a service provider of the document management system, manages information and operations concerning plural organizations using the document management system. In contrast, the in-house management system 150 manages information and operations concerning the organization within the organization in-house network, under the management of the management system 200.

The in-house management system 150 includes a local user ID server 152, a local DID server 154, and a local metadata server 156.

The local user ID server 152 manages information concerning the members of the organization registered in the document management system. The information concerning the individual users stored in the local user ID server 152 is similar to the general user information stored in the user ID server 210 shown in FIG. 4. When a user is registered in a processing device 110 as a user using the processing device 110 as the prescribed processing device, the processing device 110 sends information concerning this registered user to the local user ID server 152. The local user ID server 152 stores the user information and also sends it to the user ID server 210 of the management system 200 via the wide area network 10. The user ID server 210 stores the user information. If any change is made to information concerning a user registered in the processing device 110, the administrator, for example, updates the information concerning this user stored in the processing device 110. The processing device 110 sends the content of a change made to the information concerning this user (such as the user ID, the name of an item of information to which a change is made, and the updated value of this item) to the local user ID server 152. The local user ID server 152 then changes the information concerning this user stored in the local user ID server 152 in accordance with the content of a change. The local user ID server 152 also sends information concerning the content of a change to the user ID server 210. The user ID server 210 changes the information concerning this user stored in the user ID server 210 in accordance with the content of a change.

The local DID server 154 receives DIDs issued by the processing devices 110 of the individual local systems 100 disposed within the organization in-house network, and stores the received DIDs. Information stored in the local DID server 154 is similar to that stored in the DID server 220 shown in FIG. 5. The local DID server 154 sends information concerning the DIDs received from the processing devices 110 to the DID server 220, and the DID server 220 stores this information. The local DID server 154 receives a DID issue right and a DID issue limit from the DID server 220. Based on this DID issue right, the local DID server 154 provides a DID issue right and a DID issue limit to each processing device 110 disposed within the organization in-house network within the range of the DID issue limit received from the DID server 220.

The local metadata server 156 receives metadata of eDoc files generated by the processing devices 110 of the individual local systems 100 disposed within the organization in-house network, and stores the received metadata. Information stored in the local metadata server 156 is similar to that of the metadata server 230. The local metadata server 156 also sends metadata received from the processing devices 110 to the metadata server 230, and the metadata server 230 stores the metadata.

Figure 12:
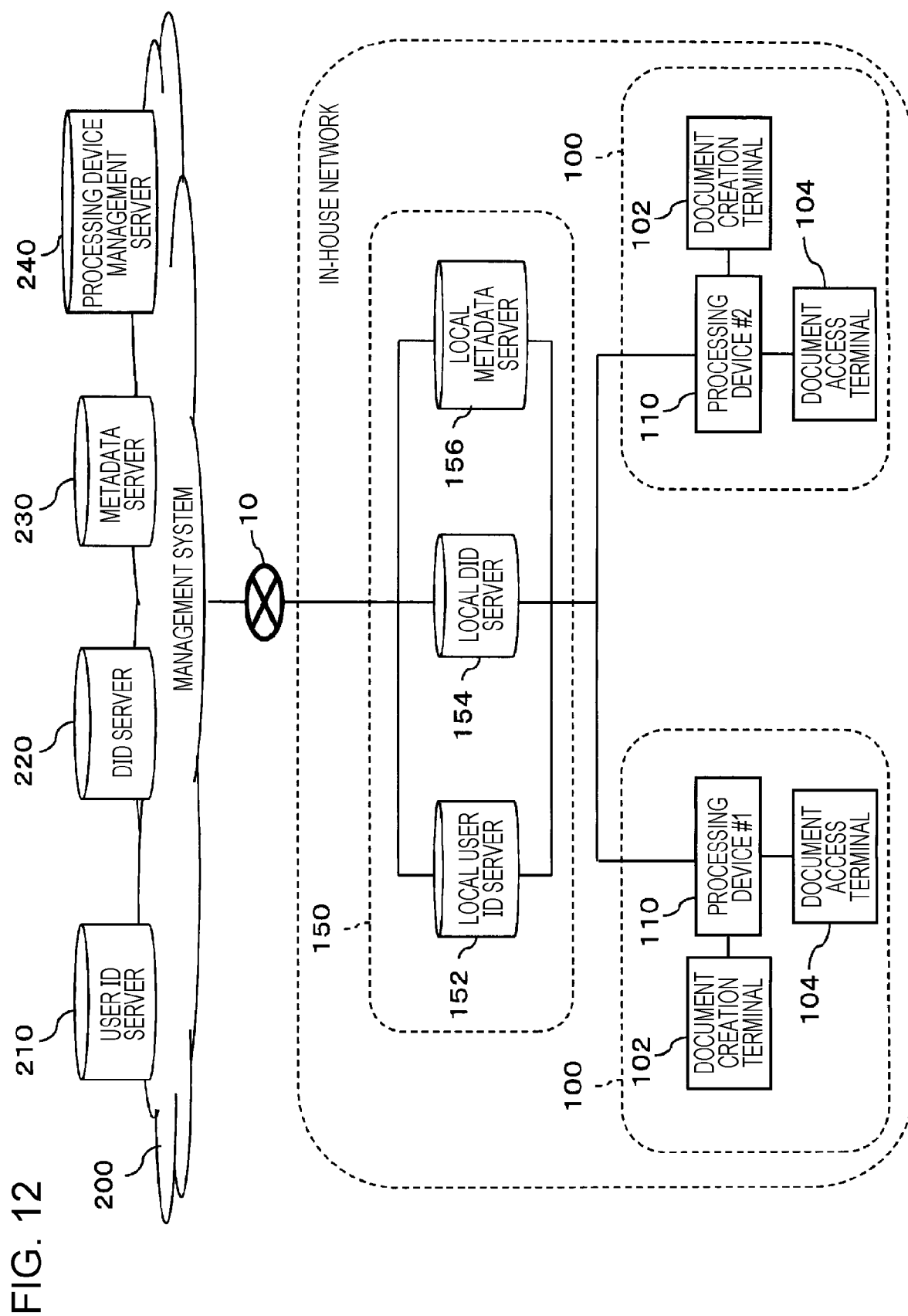
FIG. 12 is a schematic diagram illustrating an example of the configuration of a document management system including an in-house management system.

In the example of the document management system shown in FIG. 12, when a request is made to register and distribute a document or to obtain an eDoc file or metadata from a user who is not registered in a subject processing device 110 but is registered in another processing device 110 within the same organization, the subject processing device 110 executes processing by responding to this request via the in-house management system 150.

Figure 13:
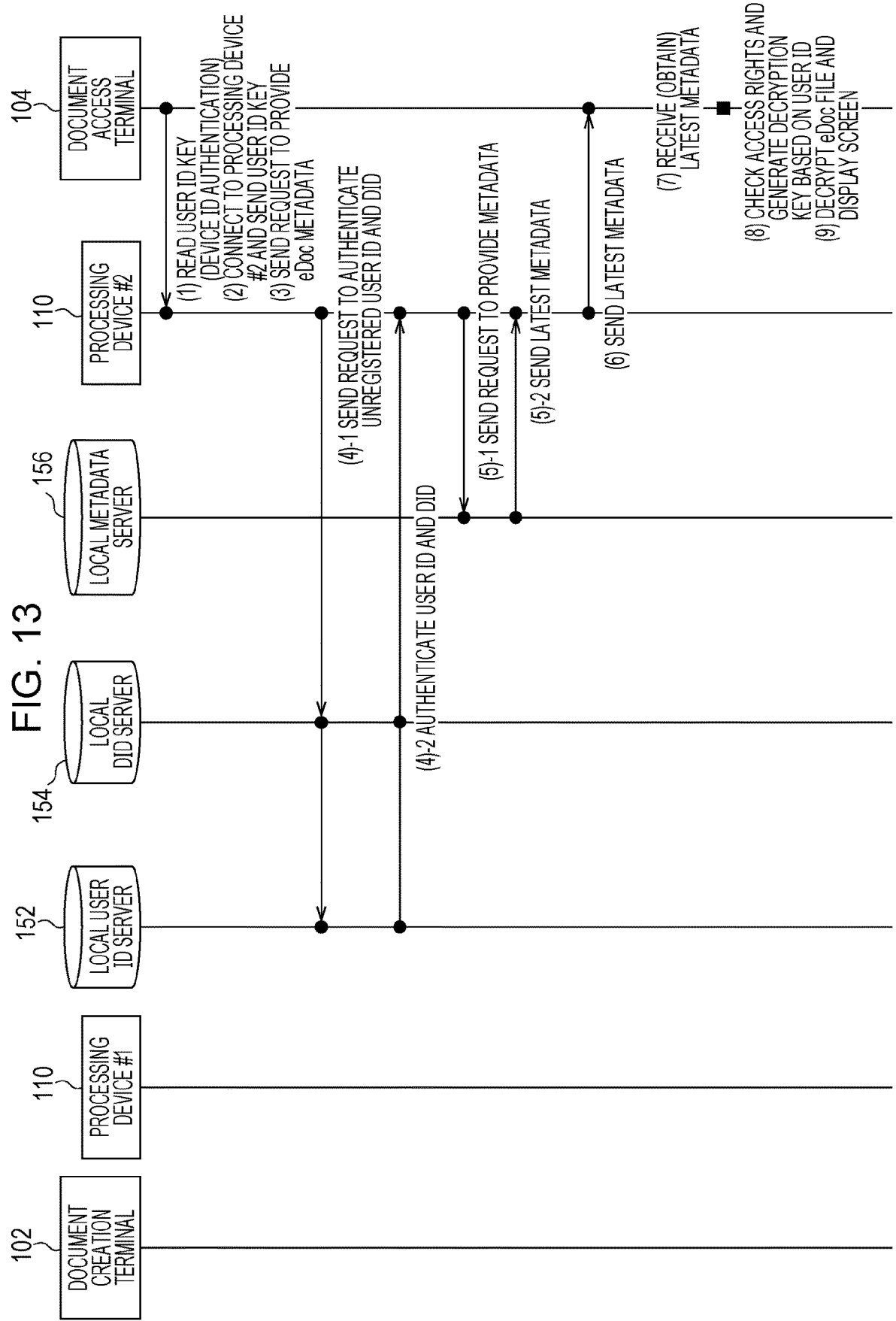
FIG. 13 illustrates an example of a processing procedure to be executed when a user obtains metadata of a document and accesses this document by using a processing device in which the user is not registered.

An example of such a situation will be considered as follows. A processing device #1 within a first local system 100 is installed at a first department within the organization in-house network. A user registered in the processing device #1 stores an eDoc file and metadata registered in the processing device #1 in the document access terminal 104 of this user. Then, the user goes to a second department managed by a processing device #2 within a second local system 100 and tries to access the eDoc file by using the document access terminal 104 at the second department. It is assumed that, at this time point, the access effective period of the metadata of the eDoc file stored in the document access terminal 104 has already expired. Under this situation, when the user tries to open the eDoc file by using the document access terminal 104 at the second department, the processing shown in FIG. 13 is executed.

The document access terminal 104 first searches for a processing device 110 from the local network 108 of the second local system 100 to which the document access terminal 104 is connecting. Then, the processing device #2 is found. The processing device #2 is different from the processing device #1, which has distributed the eDoc file stored in the document access terminal 104, and does not have the eDoc file and metadata.

(1) The document access terminal 104 reads the user ID key (authentication information) from the authentication device 130 of the user.

(2) The document access terminal 104 sends the user ID key obtained from the authentication device 130 to the processing device #2 to conduct user authentication for obtaining the latest metadata of the eDoc file.

(3) The document access terminal 104 sends a request to provide the metadata of the eDoc file to the processing device #2. This requests includes the DID of the eDoc file.

(4)-1 The processing device #2 checks whether the user ID key received from the document access terminal 104 is the key of one of the users registered in the processing device #2 (user authentication). In this example, the user sent the user ID key is not registered in the processing device #2, and the processing device #2 sends a request to conduct user authentication with the user ID key to the address of the local user ID server 152. The processing device #2 also sends the DID included in the request from the document access terminal 104 to the local DID server 154 for authentication.

(4)-2 The local user ID server 152 checks whether the user ID key received from the processing device #2 is the key of one of the users registered in the local user ID server 152 (user authentication). The user of the user ID key is registered in the processing device #1 and is thus registered in the local user ID server 152, which is the host device of the processing device #1. The local user ID server 152 succeeds user authentication and then returns a response indicating the success of user authentication to the processing device #2.

The local DID server 154 judges whether the DID sent from the processing device #2 is an authorized DID, that is, whether it is a DID stored in the local DID server 154. In this example, the DID of the eDoc file is issued by the processing device #1 and is thus stored in the local DID server 154, which is the host device of the processing device #1. The DID is thus authenticated as an authorized DID. The local DID server 154 returns a response indicating the success of DID authentication to the processing device #2.

(5)-1 User authentication and DID authentication have succeeded, and the processing device #2 continues processing for responding to a request for the metadata from the document access terminal 104. That is, the processing device #2 sends a request for the metadata, together with the DID, to the address of the local metadata server 156.

(5)-2 Upon receiving the request from the processing device #2, the local metadata server 156 returns the metadata associated with the DID included in the request to the processing device #2. When a change is made to metadata of an eDoc file in a processing device 110 by a distributor user, it is immediately reflected in information in the local metadata server 156. Accordingly, the metadata returned from the local metadata server 156 to the processing device #2 is the latest metadata of the eDoc file.

(6) The processing device #2 sends the latest metadata received from the local metadata server 156 to the document access terminal 104.

(7) The document access terminal 104 receives the latest metadata and stores (caches) it.

(8) The document access terminal 104 refers to the distribution receiver information of the received metadata and checks for a right concerning a combination of the document access terminal 104 and the user. That is, if a combination of the document access terminal 104 and the user is found among the combinations of distribution receiver users and distribution receiver terminals indicated by the distribution receiver information (see FIG. 3), the document access terminal 104 determines that this user has an access right. If such a combination is not found, the document access terminal 104 determines that the user does not have an access right. If the user does not have an access right, the document access terminal 104 displays an error message. If the user has an access right, the document access terminal 104 extracts the encrypted key for this user contained in the encryption information in the metadata, and decrypts the encrypted key with the private key (stored in the authentication device 130) of the user, thereby reproducing the decryption key for decrypting the eDoc file.

(9) The document access terminal 104 decrypts the eDoc file with the reproduced decryption key so as to reproduce the document, and outputs the document by displaying it on the screen, for example. The document access terminal 104 also judges whether to accept an operation instruction for the document from the user, based on the access right information included in the metadata.

It is now assumed that a user registered in the processing device #1 within the first local system 100 wishes to register a document in the document management system at the second department managed by the processing device #2. A processing procedure to be executed under this situation will be described below with reference to FIG. 14. This user (document distributor) is not registered in the processing device #2.

(1) The distributor user instructs the document creation terminal 102 of the user to register a document. The document creation terminal 102 displays a screen for instructing the user to input login authentication information. In response to this instruction, the distributor user inputs authentication information, such as a user ID and a password, and the document creation terminal 102 sends the authentication information to the processing device #2 via the local network 108.

(2) The processing device #2 judges whether the authentication information received from the document creation terminal 102 is that of one of the users registered in the processing device #2. The distributor user is not registered in the processing device #2. The processing device #2 thus sends the authentication information to the local user ID server 152, which is a host device of the processing device #2, and requests it to conduct user authentication.

(3) The local user ID server 152 judges whether the authentication information received from the processing device #2 is that of one of the users registered in the local user ID server 152 (user authentication). In this example, the distributor user is registered in the processing device #1 and is thus registered in the local user ID server 152. The local user ID server 152 succeeds user authentication and returns a response indicating the success of user authentication to the processing device #2.

(4) Upon receiving the response from the local user ID server 152, the processing device #2 returns a response indicating the success of user authentication to the document creation terminal 102.

(5) The document creation terminal 102 sends the document selected by the distributor user and the attribute data input by the distributor user to the processing device #2.

(6) The processing device #2 receives the document and the attribute data from the document creation terminal 102.

(7)-1 If the processing device #2 has already used the maximum number of DIDs represented by the DID issue limit, it requests the local DID server 154 to issue a new DID access right and a DID issue limit. If the processing device #2 still has a DID that has not been issued, it skips this step and proceeds to step (8).

(7)-2 In response to the request from the processing device #2, the local DID server 154 provides a new DID issue right and a DID issue limit to the processing device #2. If the local DID server 154 has already used the maximum number of DIDs provided from the DID server 220, the local DID server 154 requests the DID server 220 to provide a new DID issue right and a DID issue limit. Based on the DID issue right and the DID issue limit, the local DID server 154 provides a DID issue right and a DID issue limit to the processing device #2.

(8) The processing device #2 issues a DID by using the received DID issue right and appends this DID to an eDoc file to be generated from the subject document.

(9)-1 The processing device #2 generates an encryption key for encrypting the subject document, encodes the subject document into a dedicated format designed for the document management system, and encrypts the encoded document with the encryption key, thereby generating an eDoc file.

(9)-2 The processing device #2 adds the issued DID and items of data, such as the encoded date, to the attribute data received from the document creation terminal 102, thereby generating metadata of the eDoc file.

(10) The processing device #2 uploads the DID and the metadata to the local DID server 154 and the local metadata server 156, respectively. The local DID server 154 adds the uploaded DID to the issued DID list (see FIG. 5) corresponding to the DID issue right key contained in the DID, and also uploads the DID to the DID server 220. The DID server 220 uploads this DID to the issued DID list (see FIG. 5) corresponding to the DID issue right key. The local metadata server 156 stores the metadata uploaded from the processing device #2 and also uploads it to the metadata server 230. The metadata server 230 stores this metadata.

The processing device #2 distributes the generated eDoc file to the distribution receivers selected by the distributor user. This processing is similar to steps (7) through (12) in FIG. 8.

(11) The processing device #2 also sends the generated eDoc file and metadata to the document creation terminal 102. After sending the eDoc file and metadata, the processing device #2 may store them or delete them. If the eDoc file and metadata are deleted, they are stored only in the processing device #1, which is the prescribed processing device 110 of the distributor user, among the processing devices 110 within the organization. This operation will be discussed in step (13). The processing device 110 (processing device #2 in this example) that is requested to register and distribute a document by a distributor user may be able to determine by itself whether to store a generated eDoc file and metadata.

(12) The document creation terminal 102 stores the eDoc file and metadata received from the processing device #2 in order to transfer them to the processing device #1 later.

(13) After returning to the first department with the document creation terminal 102, the distributor user searches for the processing device #1, which is the prescribed processing device of this user, on the first local network 108. After the processing device #1 is found, the document creation terminal 102 registers the eDoc file and metadata stored in step (12) in the processing device #1. If the distributor user wishes to change the content of metadata (distribution receiver, for example) later, it accesses the processing device #1 and changes it.

In the above-described document management system, the document body (that is, an eDoc file) that the document creation terminal 102 has requested a processing device 110 to distribute is stored only in the processing device 110 and a document access terminal 104, which is a distribution receiver, and is not output to other networks or devices. This can minimize the risk of a leakage of this eDoc file. In particular, if the distribution receivers are restricted to the document access terminals 104 on the local network 108 in which this eDoc file is generated, the eDoc file is not output from this local network 108.

Metadata of an eDoc file is registered in the management system 200 or the in-house management system 150 of a certain organization. Even if a user goes anywhere with the document access terminal 104 of the user, metadata can be obtained via the wide area network 10 or the private network of an organization. Upon receiving an instruction to access an eDoc file from the user, the document access terminal 104 obtains the latest metadata of this eDoc file from the in-house management system 150 or the management system 200, and determines whether to permit the user to access the eDoc file, based on the distribution receiver information contained in the latest metadata. If this user is selected as a distribution receiver when the eDoc file has been registered and distributed, but is excluded due to a change to the distribution receivers afterwards, the user is not permitted to access the eDoc file.

Figure 14:
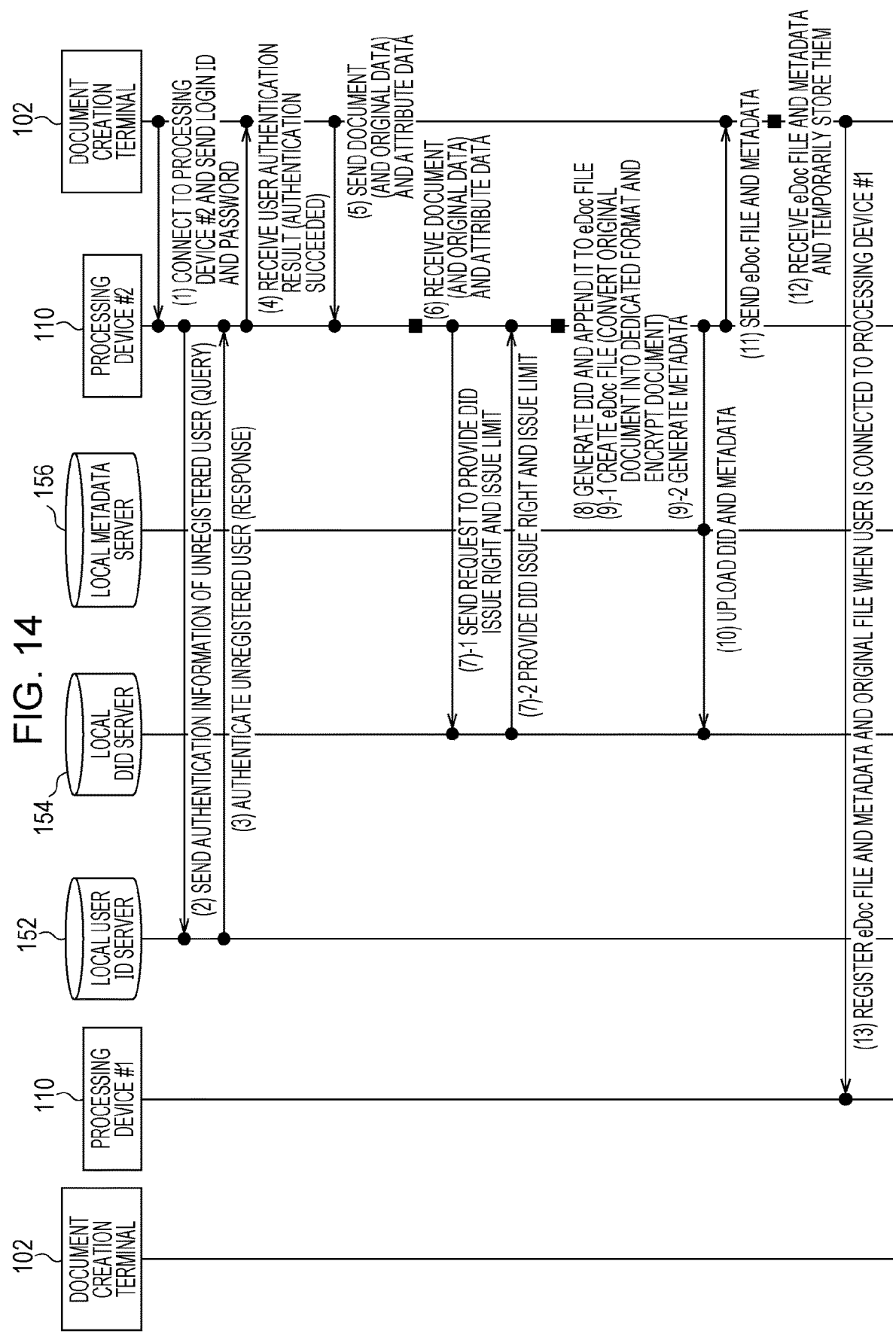
FIG. 14 illustrates an example of a processing procedure to be executed when a user registers a document in the document management system by using a processing device in which the user is not registered.

In the examples in FIGS. 13 and 14, both of the processing device #1 and processing device #2 are disposed within the same organization, and the distribution receiver users belong to this organization. Accordingly, user authentication is conducted by the local user ID server 152 of this organization. If a user wishing to access a document does not belong to this organization, neither of the processing device #2 nor the local user ID server 152 is able to authenticate this user. In this case, the user ID server 210, which is the host device of the local user ID server 152, may conduct user authentication.

In the examples in FIGS. 13 and 14, in response to a request to access or register a document, the processing device #2 acts for the processing device #1 to perform various operations between the document access terminal 104 or the document creation terminal 102 and the local user ID server 152 and the local metadata server 156. However, this is only an example. When the processing device #2 has found that this user is not registered in the processing device #2 based on user authentication information sent from the document access terminal 104 or the document creation terminal 102, it may send a response indicating a failure of user authentication. In this case, the document access terminal 104 or the document creation terminal 102 requests the local user ID server 152 to conduct user authentication by using address information of the host devices registered in the document access terminal 104 or the document creation terminal 102. If user authentication succeeds, the document access terminal 104 accesses the local metadata server 156 and obtains required metadata, and the document creation terminal 102 sends a document to be registered to the processing device #2.

In the example in FIG. 13, a user moves to another department in a local system 100 within the same organization and accesses a document by using a processing device 110 different from the prescribed processing device 110 of this user. Even outside the organization of this user, the user may be able to access a document distributed from the prescribed processing device 110 of this user. In this case, the document access terminal 104 of the user requests the user ID server 210 of the management system 200 to conduct user authentication, and if user authentication succeeds, the document access terminal 104 obtains metadata of the document from the metadata server 230.

(Example of DID)

The configuration of a DID 600 used as identification information for an eDoc file in the document management system will be discussed below with reference to FIG. 15.

Figure 15:
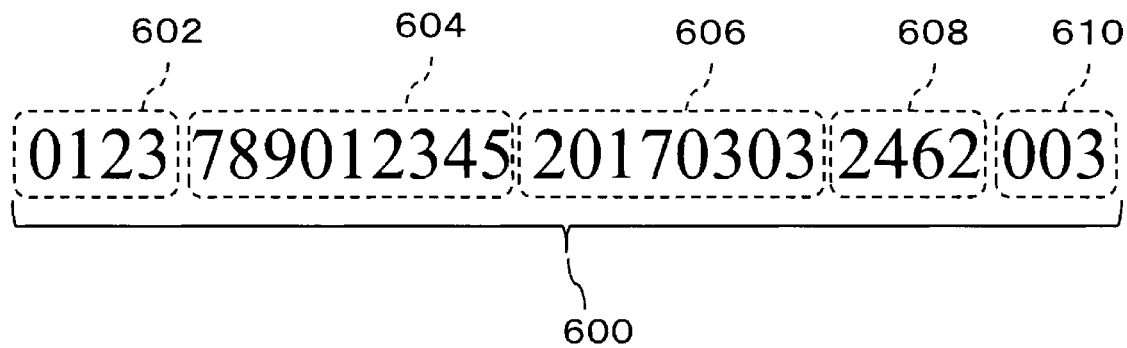
FIG. 15 illustrates an example of the data content of a DID.

As shown in FIG. 15, the DID 600 indicates a DID issue right key 602, processing-device unique information 604, a DID issued date 606, a DID issue certificate key 608, and a DID issue number 610. The numbers of digits used in the DID 600, the DID issue right key 602, the processing-device unique information 604, the DID issued date 606, the DID issue certificate key 608, and the DID issue number 610 shown in FIG. 15 are only examples.

The DID issue right key 602 is key information for identifying a DID issue right provided to a processing device 110 by the DID server 220. Upon receiving a request to provide a DID issue right and a DID issue limit from a processing device 110, the DID server 220 generates the DID issue right key 602 and sends it together with a numerical value indicating the DID issue limit (100, for example) to the processing device 110. If the local DID server 154 intervenes between the DID server 220 and the processing device 110, the DID server 220 provides plural combinations of DID issue right keys and DID issue limits to the local DID server 154. This may mean that the DID server 220 has delegated the task of providing these plural combinations of DID issue right keys and DID issue limits to the processing devices 110 to the local DID server 154. Upon receiving a request to provide a DID issue right from a processing device 110 managed by the local DID server 154, the local DID server 154 provides a combination of an unassigned DID issue right key and a DID issue limit.

The processing-device unique information 604 is information unique to the processing device 110 that has issued the DID 600. That is, checking the processing-device unique information 604 within the DID 600 can uniquely identify the processing device 110 that has issued the DID 600. The processing-device unique information 604 is stored in the processing device 110.

The DID issued date 606 is a character string representing the date (year, month, and day) on which the DID 600 has been issued. The DID issued date 606 is also the date on which the eDoc file associated with the DID 600 has been generated (encoded).

The DID issue certificate key 608 is key information certifying that the processing device 110 indicated by the processing-device unique information 604 has issued the DID 600 by using the DID issue right indicated by the DID issue right key 602. The DID issue certificate key 608 indicates the value generated by encrypting the DID issue right key 602 with the private key of this processing device 110. In this case, if the value generated by decrypting the DID issue certificate key 608 with the public key of the processing device 110 matches the DID issue right key 602, the DID 600 is certified as identification information issued by this processing device 110 by using the DID issue right key 602. Alternatively, the value generated by encrypting the value of the portion of the DID 600 other than the DID issue right key 602 (or the hash value having a predetermined number of digits generated from the value of this portion) with the private key of the processing device 110 may be used as the DID issue certificate key 608. In this case, if the value generated by decrypting the DID issue certificate key 608 with the public key of the processing device 110 matches the value of the above-described portion of the DID 600 (or the hash value), the DID 600 is certified as identification information issued by this processing device 110 by using the DID issue right key 602, and it is verified that the portion of the DID 600 other than the DID issue certificate key 608 is not falsified.

The DID issue number 610 is a serial number of DIDs issued by the processing device 110 based on the DID issue right key 602. The maximum value of the DID issue number 610 of a DID 600 issued by a certain DID issue right key 602 is the value of the DID issue limit (number of documents) provided by the DID server 220 (or the local DID server 154) with this DID issue right key 602.

(Change of Distribution Receivers after Registration)

After registering an eDoc file in the document management system, a distributor user (or a user having a right to change distribution receivers) may wish to add or delete a distribution receiver or alter access rights provided to the distribution receivers. In this case, the distributor user accesses the prescribed processing device 110 by using the document creation terminal 102 or the document access terminal 104 (hereinafter may collectively be called a user terminal), selects the DID of a subject eDoc file, and instructs the prescribed processing device 110 to execute editing processing for distribution receivers (or access rights).

In response to this instruction, the processing device 110 conducts user authentication to check whether the user provided this instruction is an authorized distributor user (including a user having a right to change distribution receivers) of the subject eDoc file. If the user is authenticated as an authorized user, the processing device 110 provides an editing screen for editing distribution receivers and access rights. The editing screen is similar to the input screen 400 shown in FIG. 9. The distributor user adds or deletes a distribution receiver user or terminal or changes access rights on the editing screen. After the distributor user has made necessary changes on the editing screen and set such changes, the processing device 110 reflects such changes in the metadata of the eDoc file stored in the processing device 110 and also informs the local metadata server 156 and the metadata server 230 of the content of changes. The local metadata server 156 and the metadata server 230 reflect the content of changes in the stored metadata of the eDoc file. For example, if a user selected as a distribution receiver when the eDoc file has been distributed is excluded from a list of distribution receiver users after a certain change is made, this user is not permitted to access the eDoc file. When the distribution receiver information in the metadata is changed so that a certain document access terminal 104 is deleted from receiver terminals, for example, the processing device 110 may send an instruction to delete the eDoc file (and the associated metadata) to this document access terminal 104.

In the above-described example, the processing device 110 receives an instruction to change a distribution receiver or access rights for an eDoc file. Instead of or in addition to the processing device 110, a host device, that is, the metadata server 230 of the management system 200 or the local metadata server 156 of the in-house management system 150 may receive such an instruction. In this case, the host device sends updated metadata reflecting the content of changes to the processing device 110 that has created this eDoc file (and the local metadata server 156 within the organization of the processing device 110), and instructs the processing device 110 to replace the existing metadata stored in the processing device 110 by the updated metadata.

(Status Management for Processing Device)

Control processing concerning status management for a processing device 110 will be discussed below.

The processing device 110 regularly informs the management system 200 of the status of the processing device 110. In the management system 200, the processing device management server 240 adds the received status to the status history 242 concerning this processing device 110 in association with the received date. The processing device management server 240 also checks the received status and performs control processing concerning whether to allow the processing device 110 to provide a service to a user, based on the checking result.

Figure 6:
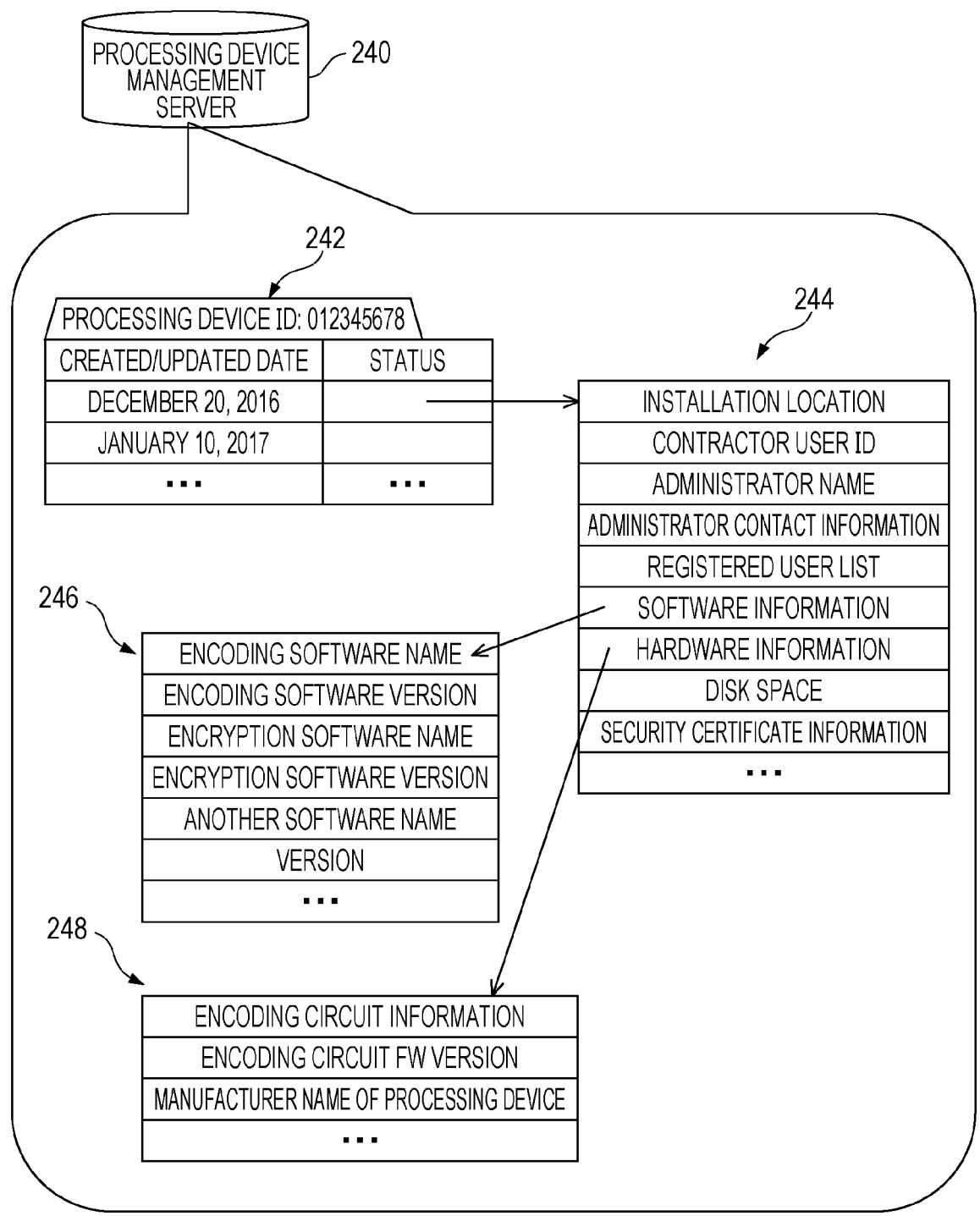
FIG. 6 illustrates an example of the content of data managed by a processing device management server.

The status regularly sent from the processing device 110 to the processing device management server 240 includes items similar to those of the status 244 shown in FIG. 6. However, among the items of the status 244, items that are not changed by the processing device 110, such as the installation location, the encoding circuit information, and the manufacturer name of the processing device 110 are not sent to the processing device management server 240 on a regular basis.

Figure 16:
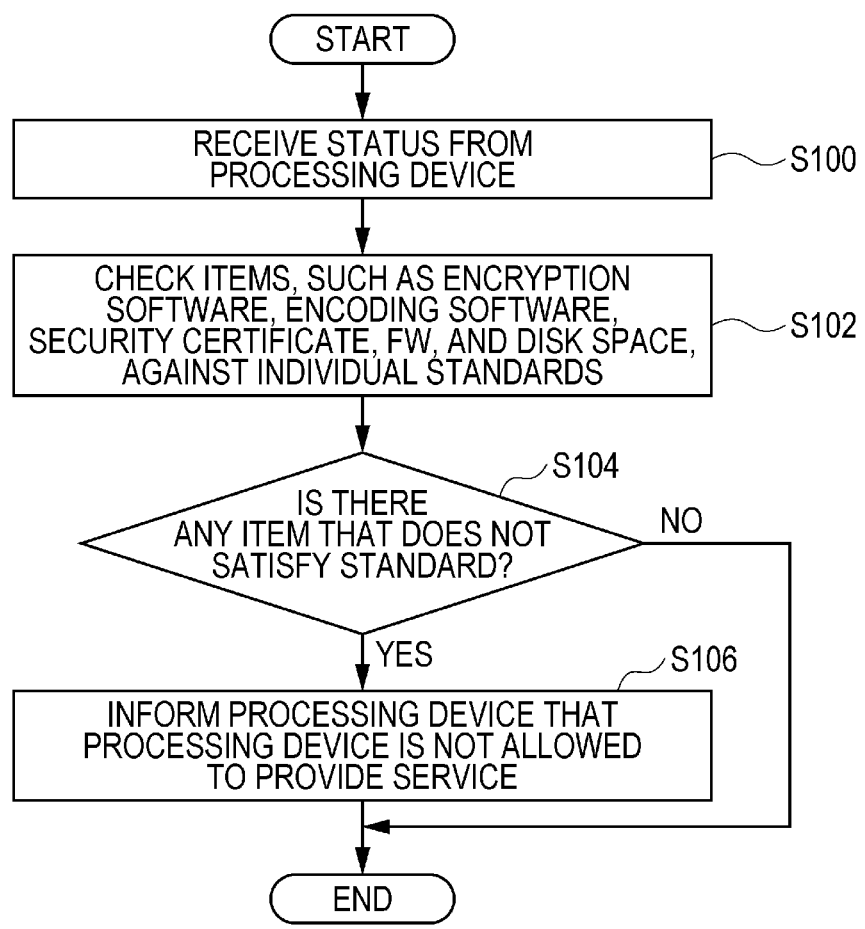
FIG. 16 is a flowchart illustrating an example of processing executed by the processing device management server to check the status of a processing device.

The processing device management server 240 executes processing shown in FIG. 16, for example, based on the status sent from the processing device 110.

In step S100, the processing device management server 240 receives the status from the processing device 110. In step S102, the processing device management server 240 then checks the values of subject items of the status against the standards of these items. Items of the status to be checked include the encryption software name and version, encoding software name and version, security certificates stored in the processing device 110, information concerning the encryption key, such as a pair of a private key and a public key, used for encrypting a communication channel and signatures installed in the processing device 110 (for example, identification information and installation date of the encryption key), encoding circuit name and FW version, types of fonts installed in the processing device 110, and disk (auxiliary storage) space. Examples of the standards of the individual items are as follows. The version of each of the encryption software, encoding software, and FW is the latest version or a certain version or later one, the value of the disk space is greater than or equal to a predetermined threshold, there is no blacklisted security certificate among those installed in the processing device 110, a predetermined period has not elapsed after the installation date of the encryption key in the processing device 110, and a predetermined type of font is installed.

For example, to maintain the safety of the encryption key for encrypting a communication channel and signatures, the encryption key is desirably changed to a new one on a regular basis. If the predetermined period has elapsed after the installation date of the encryption key, the processing device management server 240 judges that this encryption key does not satisfy the standard. The processing device management server 240 then determines that the processing device 110 is not allowed to provide a service, or issues a warning that the processing device 110 will not be allowed to provide a service. The processing device management server 240 then instructs the processing device 110 to replace the encryption key by a new one.

After step S102, the processing device management server 240 judges in step S104 whether, among the items of the status to be checked, there is an item that does not satisfy the corresponding standard. If there is no such an item, the processing device management server 240 terminates the processing. If there is such an item, in step S106, the processing device management server 240 informs the processing device 110 that the processing device 110 is not allowed to provide a service. Upon receiving this information, the processing device 110 stops registering (distributing) a document in the document management system. That is, the processing device 110 does not receive a request to register (distribute) a document from a document creation terminal 102 and returns a message that the provision of services is not available now to the document creation terminal 102.

Under this control processing, the possibility that the processing device 110 will create an eDoc file having a poor quality that does not satisfy the standards is reduced. For example, the processing device 110 stops providing services before an insufficiently encrypted eDoc file is produced because a document is encrypted with an old version of an encryption key. Additionally, the processing device 110 stops providing services before a leakage of an original document occurs due to an error during eDoc file generating processing because of a shortage of a disk space or the use of an old version of firmware. The processing device 110 also stops providing services before an eDoc file with a decreased image quality is produced because the processing device 110 does not have a predetermined type of font and encodes a document by replacing this font by another font. It is also unlikely to cause a situation where, because of the use of an old version of the encoding circuit FW, the image size of documents supported by the latest firmware is not available and an eDoc file with a restricted image size is produced.

Items of the status to be checked may be separated into two types, that is, items that influence the security of eDoc files and those that do not influence the security. The processing device 110 may stop providing services only when an item that influences the security of eDoc files does not satisfy the corresponding standard. If an item that does not influence the security of eDoc files does not satisfy the corresponding standard, the processing device management server 240 may issue a warning to the processing device 110 and its administrator and instruct them to handle an error related to this item. Upon receiving this warning, if the administrator of the processing device 110 is capable of handling this error, it corrects or repairs the processing device 110. If special maintenance staff is required, the administrator requests the operator of the document management system to send maintenance staff. Alternatively, when the processing device management server 240 determines that, among the items of the status to be checked, a specific item does not satisfy the corresponding standard, the processing device management server 240 may automatically make an arrangement for sending maintenance staff to the processing device 110.

A modified example of the processing in FIG. 16 will be discussed below with reference to FIG. 17.

Figure 17:
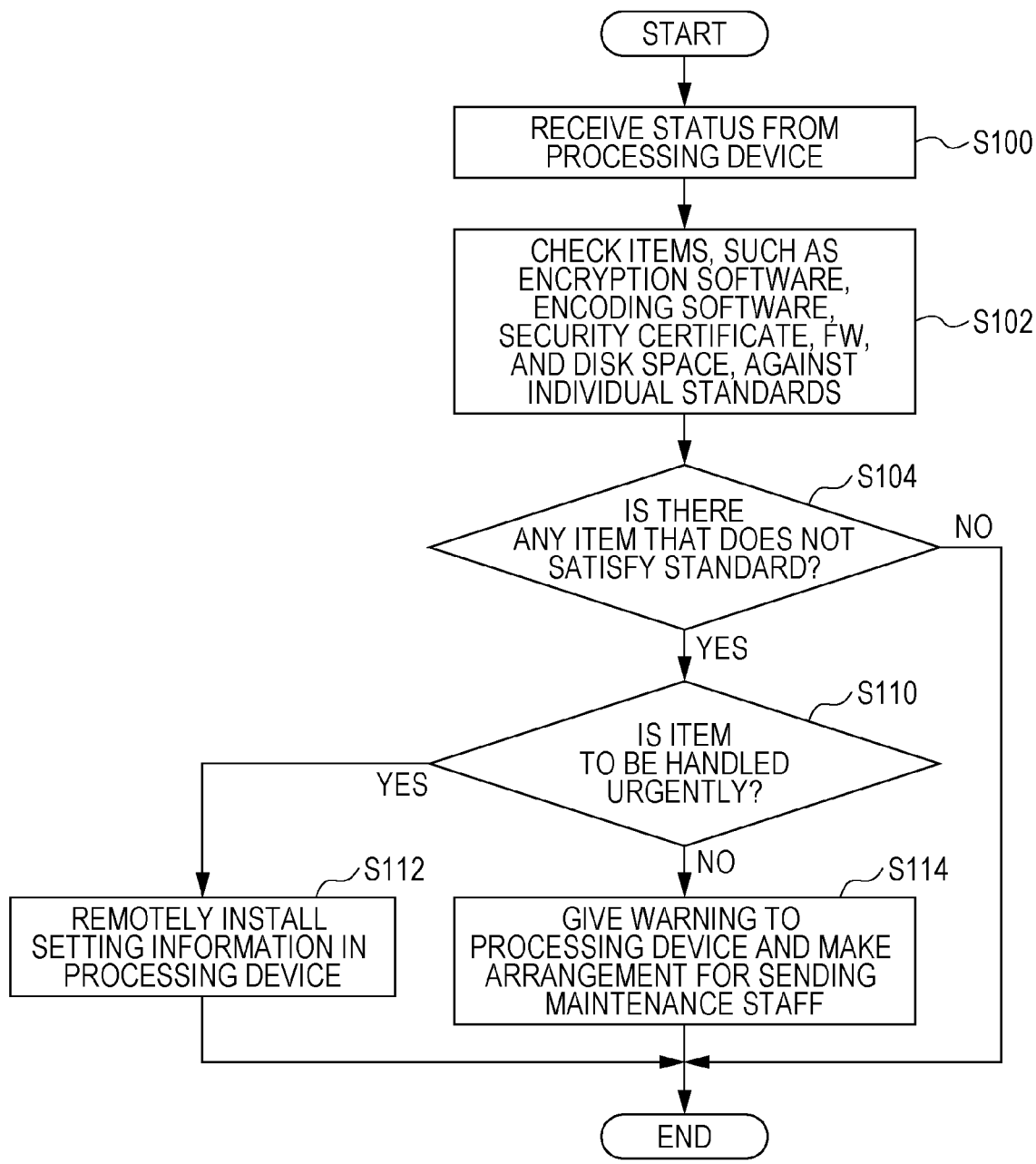
FIG. 17 is a flowchart illustrating another example of processing executed by the processing device management server to check the status of a processing device.

In the procedure of processing in FIG. 17, items of the status to be checked are divided into urgent items and non-urgent items. An urgent item is an item that may significantly influence the quality of an eDoc file generated by the processing device 110 in terms of the security of an eDoc file or the security of the document management system. If an eDoc file is produced by a processing device 110 having an urgent item that does not satisfy the corresponding standard, the security of this eDoc file is not sufficient, or if such a processing device 110 continues operating, the processing device 110 itself may become a vulnerability of the document management system. Examples of errors regarding the urgent items are that the encryption software version is not the latest one and a vulnerability is found in security certificates or the encryption key installed in the processing device 110.

One of the measures to be taken against the occurrence of errors related to an urgent item which does not satisfy the corresponding standard, the processing device management server 240 stops such a processing device 110 and sends maintenance staff to make corrections or repairs regarding this urgent item. However, a user is unable to use the processing device 110 until corrections or repairs are finished.

In the procedure of processing in FIG. 17, if the processing device management server 240 finds in step S104 that there is an item that does not satisfy the corresponding standard, it judges in step S110 whether this item is an urgent item. If the item is found to be an urgent item, in step S112, the processing device management server 240 remotely installs setting information for correcting or repairing the error of this item in the processing device 110 via the wide area network 10. Examples of the setting information are the latest version of encryption software, the latest version of a security certificate without any vulnerability, a new pair of a private key and a public key which replaces the existing pair of keys having a vulnerability.

In the case of a new pair of keys, the processing device management server 240 prepares a passphrase for generating a new pair of keys and generates a pair of keys by using this passphrase. The processing device management server 240 then remotely installs the pair of keys in the processing device 110 by transmitting it to the processing device 110 in a secure manner.

This makes it possible to update setting information for an urgent item that does not satisfy the corresponding standard into that satisfying the corresponding standard in the processing device 110. In accordance with the updating of the setting information, the value of the urgent item of the status of the processing device 110 is also updated.

If the judging result of step S110 is NO (the item that does not satisfy the corresponding standard is not an urgent item), the processing device management server 240 issues a warning about this item to the processing device 110 or its administrator in step S114 and makes an arrangement for sending maintenance staff for making corrections or repairs concerning this item. Regarding an error of an item which may not be urgently handled, a serious security problem is less likely to occur even if the processing device 110 continues operating. Thus, the processing device management server 240 does not stop the processing device 110 and makes an arrangement for sending maintenance staff. Concerning items other than urgent items, the processing device management server 240 does not have to remotely install setting information in the processing device 110, thereby avoiding an increase in the load on the processing device management server 240.

In the example in FIG. 17, the processing device management server 240 installs setting information concerning an urgent item of the status in the processing device 110 by the top-down approach, and the value of this urgent item is updated in the processing device 110. In contrast, concerning a non-urgent item of the status, in the processing device 110, maintenance staff, for example, sets or updates the value of this item and installs setting information (the latest version of encryption software, for example) concerning this item. The processing device 110 informs the processing device management server 240 that the value of a non-urgent item has been set or updated in the processing device 110. The processing device management server 240 then accordingly changes the value of this item stored in the processing device management server 240.

(DID Verification)

When a DVD issued by the processing device 110 is uploaded or in response to a request (including a DVD) to send metadata from a document access terminal 104 or a request to verify a DID from a user, the management system 200 verifies such a DID.

In this case, the DID server 220 verifies the following points about a subject DID 600 (see FIG. 15).

(a) No inconsistencies are found between the DID issue right key 602 and the processing-device unique information 604 in the DID 600.

The DID server 220 checks information stored in the DID server 220 (see FIG. 5) regarding whether the DID issue right key 602 is recorded as the DID issue right key provided to the processing device 110 indicated by the processing-device unique information 604. If the DID issue right key 602 is not recorded in the information, it means that it has not been issued to the processing device 110 indicated by the processing-device unique information 604. Accordingly, the DID issue right key 602 and the processing-device unique information 604 in the DID 600 are found to be inconsistent with each other. The DID is thus an unauthorized DID.

(b) No inconsistencies are found between the DID issue right key 602 and the DID issued date 606 in the DID 600.

The DID server 220 records the key provision date and the key use end date in association with the DID issue right key (see FIG. 5). If the DID issued date 606 in the DID 600 is not included in the period from the key provision date until the key use end date recorded in association with the DID issue right key 602, the DID issue right key 602 and the DID issued date 606 are found to be inconsistent with each other. The DID is thus an unauthorized DID.

(c) No inconsistencies are found among the DID issue right key 602, the processing-device unique information 604, and the DID issue certificate key 608 in the DID 600.

The DID server 220 decrypts the DID issue certificate key 608 with the public key of the processing device 110 indicated by the processing-device unique information 604, and judges whether the resulting DID issue certificate key matches the DID issue certificate key 608 in the DID 600. If the two DID issue certificate keys do not match each other, it means that the DID issue right key 602, the processing-device unique information 604, and the DID issue certificate key 608 in the DID 600 are not consistent with one another. The DID is thus an unauthorized DID.

(d) No inconsistencies are found between the DID issue number 610 in the DID 600 and the DID issue limit associated with the DID issue right key 602.

The DID server 220 records the DID issue limit, together with the DID issue right key 602, provided to the processing device 110 (see FIG. 5). If the DID issue number 610 in the DID 600 is greater than the number represented by the DID issue limit recorded in the DID server 220 in association with the DID issue right key 602, this DID is not an authorized DID.

(e) The DID issue number 610 in the DID 600 is different from any of the issue numbers of the issued DIDs including the same DID issue right key as the DID issue right key 602 of the DID 600. The standard for this judgement is used for verifying whether a new DID issued by the processing device 110 is different from any of the issued DIDs.

The DID server 220 records information concerning DIDs issued by using a certain DID issue right key and the issued dates in association with this DID issue right key (issued DID list shown in FIG. 5). The DID server 220 checks whether any of the issued DIDs having the same DID issue right key as the DID issue right key 602 in the DID 600 has the same DID issue number as the DID issue number 610 in the DID 600. If such a DID is found, the DID 600 is not an authorized DID.

(f) A combination of the DID issued date 606 and the DID issue number 610 in the DID 600 is not inconsistent with that of a DID issued date and a DID issue number of an issued DID including the same DID issue right key as the DID issue right key 602 of the DID 600.

The DID server 220 judges whether a combination of the DID issued date 606 and the DID issue number 610 in the DID 600 is inconsistent with that of the DID issued date and the DID issue number of each of the issued DIDs having the same DID issue right key as the DID issue right key 602 of the DID 600. That is, the DID server 220 judges whether the chronological order of the DID issued date 606 and the DID issue number 610 is correct. For example, if a DID having the issued date later than the DID issued date 606 of the DID 600 and having a smaller issue number than the DID issue number 610 of the DID 600 is found, the chronological order of the combination of the DID issued date 606 and the DID issue number 610 in the DID 600 is inconsistent with that of this issued DID. In this case, only the DID 600 or both of the DID 600 and this issued DID are determined as unauthorized DIDs.

If the DID server 220 determines, based on the verification using the above-described standards, that a certain DID is an unauthorized DID, it sends a warning by email, for example, to the administrator of the processing device 110 related to such an unauthorized DID. The warning includes a message that a falsified DID that has allegedly been issued by the processing device 110 has been found. The administrator of the processing device 110 then takes certain measures to enhance the security. The name of the administrator of the processing device 110 and its contact information are found from the information stored in the processing device management server 240 (see FIG. 6). The processing device 110 related to the unauthorized DID is the processing device 110 indicated by the processing-device unique information 604 included in the DID 600. The warning may be addressed to the processing device 110 that has received in the past the same DID issue right key as that included in the unauthorized DID.

(Processing when Vulnerability is Found in Encryption Software)

A description will be given of processing to be executed when a vulnerability is found in encryption software used for encrypting an eDoc file. When the operator of the document management system has discovered that a vulnerability is found in a specific version of encryption software used by any of the processing devices 110, it sends a message indicating the occurrence of a vulnerability to each processing device 110 via the management system 200. The message includes information concerning the encryption software name and version. If the in-house management system 150 is included in the document management system, the vulnerability message is also sent from the management system 200 to the in-house management system 150, and the in-house management system 150 sends this message to each processing device 110 managed by the in-house management system 150. In response to this message, the processing device 110 executes processing shown in FIG. 18.

In step S200, the processing device 110 receives a vulnerability message from the host device (management system 200 or in-house management system 150). Then, in step S202, the processing device 110 identifies eDoc files encrypted by the processing device 110 by using the version of the encryption software included in the message. In the document DB 116 of the processing device 110, each of the eDoc files generated by the processing device 110 and the associated metadata are stored, and from the metadata of each eDoc file, the processing device 110 can identify the encryption software name and version used for generating the corresponding eDoc file (see the structure of metadata shown in FIG. 3). In step S202, the processing device 110 identifies eDoc files encrypted with encryption software having the name and version indicated in the metadata that match those indicated in the vulnerability message.

Then, in step S204, the processing device 110 re-encrypts each of the identified eDoc files by using the current version of the encryption software installed in the processing device 110. In this example, it is assumed that the version of the encryption software in the processing device 110 is upgraded and the current version of the encryption software does not have any vulnerability. Usually, a vulnerability is found in an old version of encryption software used in the processing device 110 in the past. If the current version of encryption software installed in the processing device 110 is the same version as that of the encryption software indicated in the vulnerability message, the processing device 110 downloads the latest version of encryption software from the host device, for example, and re-encrypts the eDoc files by using the latest version of encryption software. Even if a vulnerability is found in the current version of encryption software in the processing device 110, the host device is likely to have a newer version of encryption software without any vulnerability or have information concerning the distribution source of such software. To re-encrypt each eDoc file, the processing device 110 first decrypts an eDoc file with the decryption key recorded in metadata associated with this eDoc file and then encrypts the decrypted file with a newly generated encryption key by using the latest version of encryption software without vulnerability. It is assumed that, in metadata stored in the processing device 110, the decryption key encrypted with the public key of the processing device 110 is included. Likewise, in metadata to be sent to a host device, the decryption key encrypted with the public key of this host device may be included.

In step S206, the processing device 110 updates the metadata of this eDoc file in accordance with the re-encryption operation executed in S204. That is, the processing device 110 overwrites the encoded date and encryption information (encryption software name, version information, and key information) in the metadata (see FIG. 3) by re-encrypted date and encryption information (encryption software name and version used for the re-encrypting operation and the decryption key for decrypting the encrypted file). The processing device 110 then stores the updated metadata as the latest metadata of the eDoc file, and uploads this metadata to the host device. The host device stores this updated metadata.

Then, in step S208, the processing device 110 executes processing for distributing the re-encrypted eDoc file to the document access terminals 104 indicated by the distribution receiver information in the metadata. For example, the processing device 110 sends a message that the eDoc file is now ready to be distributed to each of the receiver document access terminals 104 (see step (7) of FIG. 8). This message may include information that the updated version of the distributed eDoc file will be redistributed, in addition to the DID and document name. Upon receiving this message by the document access terminal 104, when the distribution receiver user of the document access terminal 104 selects this eDoc file on the list screen 500 (see FIG. 11), the document access terminal 104 overwrites the old version of the stored eDoc file by the updated version of the eDoc file received from the processing device 110. The document access terminal 104 also stores the updated metadata received together with the eDoc file as the latest metadata of this eDoc file. As a result, the eDoc file encrypted with the encryption software with a vulnerability and the associated metadata are eliminated from the document access terminal 104. The eDoc file encrypted with the encryption software without any vulnerability and the associated metadata are stored in the document access terminal 104.

When or before sending a message that the re-encrypted eDoc file is now ready to be distributed to each receiver document access terminal 104, the processing device 110 may send a message for instructing each document access terminal 104 to delete the existing eDoc file. This message includes the DID of the existing eDoc file. Upon receiving this message, each document access terminal 104 deletes the existing eDoc file having the DID. The associated metadata may also be deleted.

(Another Example of Selection of Receiver Document Access Terminal)

In the above-described example, when distributing a document, a distributor user selects distribution receiver users and document access terminals 104 on a UI screen (input screen 400 shown in FIG. 9) of a document creation terminal 102. In this case, receiver users and document access terminals 104 to be selected by the distributor user are restricted to those registered in the processing device 110 within the same local system 100 of the distributor user or those registered in the in-house management system 150 within the same organization of the distributor user (in this case, the distributor user may select users and document access terminals 104 registered in another processing device 110).

There may be situation, however, where users within a certain organization have a meeting with a user (guest user) outside this organization. This guest user may be asked to see a document, such as a meeting memorandum. In this case, registering the guest user and its mobile terminal in the processing device 110 or the host device of this organization and canceling the registration after the meeting is over is time-consuming and troublesome.

In this document management system, an eDoc file can be distributed to a document access terminal 104 that is identified as a guest terminal under certain restrictions.

For example, the terminal of a user located near a document creation terminal 102 is regarded as a guest terminal and is added to the options of the receiver terminal selection menu 406. The terminal of a user located near a processing device 110 is also regarded as a guest terminal and is added to the options of the receiver terminal selection menu 406. The document creation terminal 102 and the processing device 110 are likely to be installed in a room within the building of an organization (such as in the office or a meeting room of a department). People located close to the document creation terminal 102 or the processing device 110 are assumed as those permitted to enter this room for a meeting, for example.

For example, the processing device 110 or the document creation terminal 102 searches for communication partner terminals by using NFC, such as Bluetooth Low Energy (registered trademark). The processing device 110 or the document creation terminal 102 then assumes the searched partner terminals as guest terminals located close to the processing device 110 or the document creation terminal 102. The processing device 110 or the document creation terminal 102 may alternatively assume the searched terminals located within a predetermined distance from the processing device 110 or the document creation terminal 102 (some NFC protocols can measure a communication distance between devices) as guest terminals. Then, the names of the guest terminals are displayed in the receiver terminal selection menu 406 as options in a display mode different from that of the already registered document access terminals 104 within the organization. The distributor user can then select a guest terminal among the options.

Instead of selecting all terminals located near the processing device 110 or the document creation terminal 102 as guest terminals, the processing device 110 or the document creation terminal 102 may select terminals that are located nearby and also satisfy predetermined conditions as guest terminals. Examples of the predetermined conditions are that the version of specific software, such as a viewer application, installed in the terminals is a certain version or later one and the terminals are not included in a predetermined denied terminal list.

Usually, a user with a guest terminal visiting a certain organization is not registered in a processing device 110 or the local user ID server 152 of this organization. In response to a request to send an eDoc file and metadata from a guest terminal, the processing device 110 may omit to conduct user authentication and distribute the eDoc file and metadata to the guest terminal. In the metadata, a deletion instruction to delete the eDoc file and metadata from the guest terminal when a certain deletion condition is satisfied is included. Examples of the deletion condition are that the displaying of the screen of the eDoc file is over (user has finished reading the eDoc file) and a predetermined expiration period has elapsed from a time point when the eDoc file is distributed. When the deletion condition is satisfied, the guest terminal deletes the eDoc file and metadata from the guest terminal. This decreases the risk of a leakage of an eDoc file via a guest terminal.

(Approaches to Responding to Request from Terminal other Than Receiver Terminals)

In the above-described example, push-type distribution is conducted. That is, a distributor user distributes an eDoc file (or a message that the eDoc file is now ready to be distributed) to a document access terminal 104 selected as a distribution receiver terminal.

However, the following pull-type distribution may alternatively be conducted. In response to a request from a document access terminal 104, a list of eDoc files stored in the processing device 110 is sent to the document access terminal 104. Then, a user of the document access terminal 104 selects an eDoc file from the list, and this eDoc file is sent to the document access terminal 104. In the case of pull-type distribution, a distribution receiver user may access a processing device 110 by using a document access terminal 104 which is not selected as a receiver terminal and send a request for an eDoc file. To respond to such a request by the processing device 110, the following approaches may be considered.

(First Approach)

Upon receiving a request to distribute an eDoc file from a document access terminal 104, the processing device 110 first judges whether the document access terminal 104 is included in terminals indicated by the distribution receiver information of the latest metadata of this eDoc file. If the document access terminal 104 is not included, the processing device 110 sends neither of the eDoc file (body) nor the associated metadata to the document access terminal 104. If the document access terminal 104 is included, the processing device 110 may judge whether the user sent this request (or a combination of the document access terminal 104 and the user) is included in receiver users and terminals indicated by the distribution receiver information. If the user is included, the processing device 110 may send the eDoc file and metadata. If the user is not included, the processing device 110 may send neither of the eDoc file nor metadata.

In the first approach, an eDoc (body file and metadata) is not distributed to a document access terminal 104 which is not selected by a distributor user as a receiver terminal.

(Second Approach)

In a second approach, even when a document access terminal 104 used for sending a request to distribute an eDoc file is not one of the document access terminals 104 indicated by the distribution receiver information of the metadata of this eDoc file, if the user sent the request (user using the document access terminal 104) is included in the receiver users indicated by the distribution receiver information, the processing device 110 sends the eDoc body file and metadata. In this case, however, the processing device 110 embeds flag information, which indicates that it is not allowed to store the eDoc file, in the eDoc file and metadata. Upon receiving such an eDoc file and metadata, the document access terminal 104 displays the eDoc file, but does not accept an instruction to store the eDoc file from a user and discards it after the user finishes reading this eDoc file.

In the above-described second approach, the storing of an eDoc file in the document access terminal 104 may temporarily be permitted. In this case, however, when the user wishes to reopen the eDoc file by using the document access terminal 104 afterwards, the document access terminal 104 sends a request for the latest metadata of the eDoc file to the processing device 110. This request is made to ask for permission for access to the eDoc file. The terminal device 110 judges whether a combination of the document access terminal 104 and the user sent this request is included in receiver users and terminals indicated by the distribution receiver information of the metadata. If the combination of the document access terminal 104 and the user is not included, the processing device 110 sends an instruction to delete the eDoc file. In response to this instruction, the document access terminal 104 deletes the eDoc file and the associated metadata. Instead of sending this instruction, the processing device 110 may simply send the latest metadata. In this case, the document access terminal 104 judges whether a combination of the document access terminal 104 and the user currently using the document access terminal 104 is included in the updated metadata. If it is not included, the document access terminal 104 does not open the eDoc file and may delete it.

Figure 18:
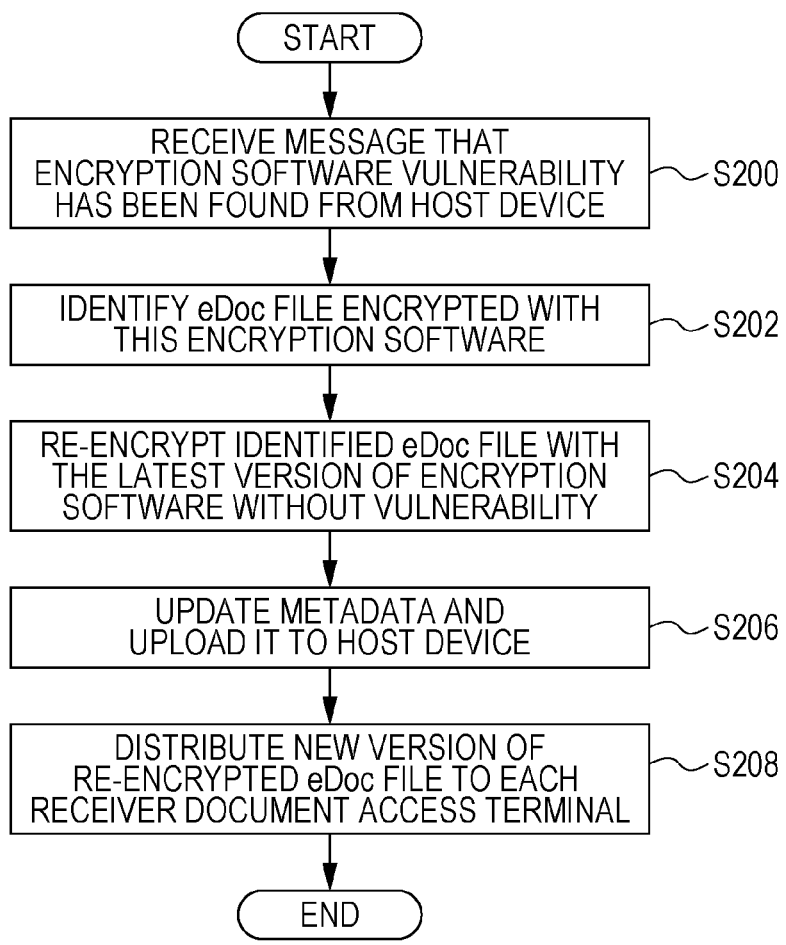
FIG. 18 is a flowchart illustrating processing executed by a processing device when a vulnerability is found in encryption software.

In the above-described example in FIG. 18, the re-encrypted eDoc file uses the same DID as that of the eDoc file which has not been re-encrypted. However, a different DID may be appended to the re-encrypted eDoc file. In this case, the processing device 110 sends an instruction to delete the old eDoc file to each receiver document access terminal 104. This instruction includes the DID of the old eDoc file. This makes it possible to eliminate the eDoc file with a vulnerability from each receiver document access terminal 104. The processing device 110 also records association information indicating that the old eDoc file and the re-encrypted eDoc file are the same document in the metadata of the re-encrypted eDoc file or in the processing device 110 (or the host device, that is, the DID server 220 or the local DID server 154). If the association information is recorded in the metadata of the re-encrypted eDoc file, a "previous DID" field is added to the metadata, and the DID of the old eDoc file is included in this "previous DID" field.

(Load Distribution between Processing Devices)

In the above-described example, when a request to register a document is sent to a processing device 110, this processing device 110 converts the document into an eDoc file. Processing for converting a document into an eDoc file, involving encoding and encryption, imposes a heavy load on a processing device 110. If the load of the processing device 110 received a request to register a document is already high, it may take a considerably long time to execute and complete this processing.

Under such circumstances, load distribution between processing devices 110, which will be discussed below, may be conducted.

(A) When a Request to Register a Document Is Sent to a Home Device

An example of load distribution processing will be discussed below with reference to FIG. 19. FIG. 19 illustrates a processing procedure to be executed when a user sends a request to register a document to a processing device 110 in which this user is registered (such a processing device 110 will be called the home device for this user).

In this example, to reduce the risk of a document leakage, load distribution is conducted between the processing devices 110 within the same organization in-house network. In the organization in-house network, the in-house management system 150 (see FIG. 12) is disposed, and the individual processing devices 110 disposed within the organization in-house network are managed by this in-house management system 150.

(1) A user first logs in a processing device 110-1 (hereinafter called the processing device #1), which is the home device, from the document creation terminal 102 of the user. The user then sends a document to be registered to the processing device #1 and requests it to execute processing for converting the document into an eDoc file.

(2) When the processing device #1 has received the request to register the document, it is judged whether to let the processing device #1 or another processing device 110 process the request, based on the load status of the processing device #1. This judgement may be made by the processing device #1 or by the in-house management system 150. For example, the processing device #1 finds the value of its processing load according to a known technique from the current central processing unit (CPU) load, memory usage, operations in a queue of the processing device #1. If the value of the processing load is smaller than or equal to a predetermined threshold, the processing device #1 will process the request by itself. If the value of the processing load exceeds the predetermined threshold, another processing device 110 will process the request, that is, load distribution will be conducted. The in-house management system 150 regularly collects and records information concerning the processing loads of the processing devices 110 managed by the in-house management system 150 (or information concerning materials for finding the processing load, such as the CPU load). The in-house management system 150 may thus determine the processing load of the processing device #1 by using this information and make the above-described judgement based on the determined processing load. In the example in FIG. 19, it is determined that the request will be processed by another processing device 110.

(3) In this case, it is further determined which processing device 110 within the organization in-house network will process this request. This judgement is made based on the latest statuses of the processing loads of the processing devices 110 within the organization in-house network. For example, the processing device 110 currently having a lower processing load is more likely to be selected. Typically, the in-house management system 150 which keeps track of information concerning all the processing devices 110 within the organization in-house network selects the processing device 110 to process the request. However, this is only an example. The processing device #1 may alternatively obtain information concerning the processing loads of the other processing devices 110 within the organization in-house network from the in-house management system 150 or from the other processing devices 110, and select the processing device 110 to process the request based on the obtained information. In the example in FIG. 19, a processing device 110-2 (hereinafter called the processing device #2) is selected. Basically, the processing device #2 is not a processing device 110 in which the user sent the request is registered. However, if this user has plural home devices, one of the home devices that has not been used for sending the request may be selected as the processing device #2.

(4) The processing device #1 forms a set of data items to be used for processing this request into a package and transfers the package to the processing device #2 via the organization in-house network. Examples of the data items to be packaged are a document to be converted into an eDoc file, user information, such as the user ID of the user sent the request, a DID to be appended to this document, the processing device ID of the processing device #1, and information concerning a distribution receiver of an eDoc file. The DID to be appended to the document is selected by the processing device #1 from among the DIDs assigned to the processing device #1 from the host device (in-house management system 150 or management system 200). Then, the DID managed by the processing device #1 will be appended to an eDoc file. The load of selecting a DID and forming data items for processing the request into a package and transferring the package is much lower than that of encoding and encrypting the document. Accordingly, even the processing device #1 having a high processing load is able to execute this processing without considerable delay.

(5) Upon receiving the package from the processing device #1, the processing device #2 converts the document within the package into an eDoc file by using the package. In this eDoc processing, the processing device #2 uses the DID within the package as that for an eDoc file to be generated and executes processing similar to steps (5)-1 and (5)-2 of FIG. 8. That is, the processing device #2 converts the document into an eDoc file and generates metadata.

(6) Upon completion of the generation of the eDoc file, the processing device #2 generates log information concerning the generation of the eDoc file and sends the log information to the in-house management system 150. The in-house management system 150 records the received log information. The processing device #2 may also upload the metadata (including the DID) generated in step (5) to the in-house management system 150.

(7) The processing device #2 sends a message that the eDoc file is now ready to be distributed to each distribution receiver indicated by the distribution receiver information included in the package received from the processing device #1. This message includes the DID and the document name. A thumbnail image of the document may also be included in the message. In the example in FIG. 19, this message is sent to the document access terminal 104 of the user sent the request to register the document, which is a default receiver.

(8) Thereafter, the processing device #2 makes a query about the load status of the processing device #1. The processing device #2 may make this query directly to the processing device #1 or to the in-house management system 150 which regularly receives information concerning the load status from the processing device #1.

(9) When the load status (load exceeding the threshold) of the processing device #1 is improved, a message indicating this information is sent from the processing device #1 or the in-house management system 150 to the processing device #2 in response to the query made in step (8).

(10) Upon receiving this message, the processing device #2 sends a processing result package to the processing device #1 via the organization in-house network. Information for identifying the processing device #1 (processing device ID) to which the processing result package is addressed is included in the package received from the processing device #1 in step (4). The processing result package includes the generated eDoc file and metadata. If storage processing, which is executed in step (11), has successfully been completed, the processing device #1 sends a storage completion message to the processing device #2. Upon receiving this message from the processing device #1, the processing device #2 deletes the package received from the processing device #1 in step (4) and the processing result package sent to the processing device #1 in step (10) from the storage unit of the processing device #2. As a result, the eDoc file generated in response to the request to register the document from the user is stored only in the processing device #1 among the processing devices 110 within the organization in-house network. In this manner, in the example of load distribution processing shown in FIG. 19, the following mechanism of the document management system is maintained. That is, an eDoc registered in the document management system by a user is stored only in the home device (processing device #1 in this example) of this user. An eDoc file is stored only in the home device of a user within the document management system, except for document access terminals 104 to which the eDoc file is distributed, and is stored in none of the other processing devices 110, the in-house management system 150, and the management system 200.

(11) The processing device #1 stores the processing result package received from the processing device #2 in the document DB 116.

(12) The processing device #1 then sends a completion message and sharing information to the document creation terminal 102 used by sending the request from the user.

(13) On the document list screen of the document access terminal 104 received the message that the eDoc file is now ready to be distributed in step (7), the registered document is added as a newly arrived eDoc file. When the user provides an instruction to access this eDoc file on the document list screen, the instruction is sent to the processing device #1 on the local network 108 to which the user is connecting. If, at this time point, the processing device #1 has already received the processing result package from the processing device #2 and stored it (storage processing in step (11)), the processing device #1 shares the information concerning this eDoc file with the document access terminal 104. That is, the processing device #1 sends the eDoc body file and the latest metadata to the document access terminal 104. If the processing device #1 has not yet received the processing result package from the processing device #2 when an instruction to access the eDoc file is received from the document access terminal 104, it may redirect this instruction to the processing device #2 because the processing device #1 is requesting the processing device #2 to convert the document of the DID included in the instruction into an eDoc file. In this case, in response to the instruction redirected to the processing device #2, the processing device #2 provides the generated eDoc (file body and metadata) to the document access terminal 104.

(14) The processing device #1 shares the metadata within the processing result package with the local metadata server 156 of the in-house management system 150.

(B) When a Request to Register a Document is Sent to an Away Device

A processing procedure to be executed when a user sends a request to register a document to a processing device 110 that the user is only temporarily allowed to use (such a processing device 110 will be called an away device for this user) will be described below with reference to FIG. 20. It is assumed that the home device of this user is the processing device #1.

(1) A user first logs in a processing device 110-3 (hereinafter called the processing device #3), which is an away device, as a guest from the document creation terminal 102 of the user. The processing device #3 is connected to the same organization in-house network as the processing device #1, which is the home device of this user, and is managed by the same in-house management system 150. This guest login processing is similar to steps (1) through (4)-2 of FIG. 13. In the example of FIG. 20, it is assumed that guest login processing has succeeded. The user then sends a document to be registered to the processing device #3 by using the document creation terminal 102 and requests it to execute processing for converting the document into an eDoc file (document registration).

(2) Upon receiving the request to register a document, as in step (2) of FIG. 19, the processing device #3 or the in-house management system 150 judges whether to let the processing device #3 or another processing device 110 process the request, based on the load status of the processing device #3. In the example in FIG. 20, it is judged that the request will be processed by another processing device 110.

(3) The in-house management system 150 or the processing device #3 determines which processing device 110 within the organization in-house network will process this request, as in step (3) of FIG. 19. This judgement is made based on the latest statuses of the processing loads of the individual processing devices 110 within the organization in-house network. In the example in FIG. 20, the processing device 110-2 (processing device #2) is selected as a device to which the request will be transferred.

(4) The processing device #3 forms a set of data items required for processing the request into a package and transfers it to the processing device #2 via the organization in-house network, as in step (4) of FIG. 19.

(5) Upon receiving the package from the processing device #3, the processing device #2 converts the document within the package into an eDoc file by using the package, as in step (5) of FIG. 19.

(6) Upon completion of the generation of the eDoc file, the processing device #2 generates log information concerning the generation of the eDoc file and sends the log information to the in-house management system 150, as in step (6) of FIG. 19. The processing device #2 may also upload the metadata (including the DID) generated in step (5) to the in-house management system 150.

(7) The processing device #2 sends a message indicating that the eDoc file is now ready to be distributed to each distribution receiver indicated by the distribution receiver information included in the package received from the processing device #3, as in step (7) of FIG. 19. In the example in FIG. 20, this message is sent to the document access terminal 104 of the user sent the request to register the document, which is a default receiver.

(8) Thereafter, the processing device #2 makes a query about the load status of the processing device #3. The processing device #2 may make this query directly to the processing device #3 or to the in-house management system 150 which regularly receives information concerning the load status from the processing device #3.

(9) When the load status of the processing device #3 is improved, a message indicating this information is sent from the processing device #3 or the in-house management system 150 to the processing device #2 in response to the query made in step (8).

(10) Upon receiving this message, the processing device #2 sends the generated eDoc file and distribution receiver information to the processing device #3 via the organization in-house network. If the processing device #3 has successfully received the eDoc file and distribution receiver information, it returns a reception acknowledgement message to the processing device #2.

(11) The processing device #3 then sends a completion message and sharing information to the document creation terminal 102 used by sending the request from the user.

(12) On the document list screen of the document access terminal 104 received the message that the eDoc file is now ready to be distributed in step (7), the registered document is added as a newly arrived eDoc file. When the user provides an instruction to access this eDoc file on the document list screen, the instruction is sent to the processing device #3 on the local network 108 to which the user is connecting. If, at this time point, the processing device #3 has already received the generated eDoc from the processing device #2, the processing device #3 shares this eDoc with the document access terminal 104. That is, the processing device #3 sends the eDoc body file to the document access terminal 104. After sending the eDoc body file to the document access terminal 104, the processing device #3 may delete the eDoc file received from the processing device #2. Alternatively, after sending the eDoc body file to the document access terminal 104, the processing device #3 may delete the eDoc file received from the processing device #2, on the condition that the processing device #3 has received information that the processing device #1 has stored the eDoc file in step (14), which will be discussed later. If the processing device #3 has not yet received the eDoc from the processing device #2 when an instruction to access the eDoc file is received from the document access terminal 104, it may redirect this instruction to the processing device #2 because the processing device #3 is requesting the processing device #2 to convert the document of the DID included in the instruction into an eDoc file.

(13) Upon completion of eDoc processing in step (5), the processing device #2 sends a processing result package to the home device (processing device #1) of the user sent the request to register the document. To send the processing result package, the processing device #2 first reads the prescribed processing device ID from the information concerning this user stored in the local user ID server 152 (see FIG. 12) of the in-house management system 150 and then sends the processing result package to the processing device #1 indicated by the prescribed processing device ID. The processing result package includes at least the eDoc file generated by the processing device #2.

(14) The processing device #1 stores the processing result package received from the processing device #2 in the document DB 116. When this storage processing has successfully executed, the processing device #1 sends a storage completion message to the processing device #2.

Upon receiving this storage completion message from the processing device #1 and the reception acknowledgement message from the processing device #3 in response to the data sent in step (10), the processing device #2 deletes the package received from the processing device #3 in step (4) and the processing result package sent to the processing device #1 in step (13) from the storage unit of the processing device #2. As a result, the eDoc file generated in response to the request to register the document from the user is stored only in the processing device #1 among the processing devices 110 within the organization in-house network. In this manner, in the example of load distribution processing shown in FIG. 20, the following mechanism of the document management system is maintained. That is, an eDoc registered in the document management system by a user is stored only in the home device (processing device #1 in this example) of this user.

(15) The processing device #1 shares the metadata within the processing result package with the local metadata server 156 of the in-house management system 150.

(C) Selection of a Transfer Destination Device of a Registration Request

In the above-described processing examples (A) and (B), the processing device 110 to which a request to register a document will be transferred (hereinafter called a transfer destination device) is selected in step (3) based on the processing loads of the individual processing devices 110 within the organization in-house network. However, information other than the processing load may also be used to select a transfer destination device. For example, a transfer destination device may be selected from among processing devices 110 using the same version of encoding software and the same version of encryption software as those of the home device of the user from which a request to register a document has been sent. In this case, among such processing devices 110, the processing device 110 having the lowest processing load may be selected as the transfer destination device. With this configuration, the eDoc file generated by the transfer destination device becomes substantially comparable to that which would be generated by the processing device #1, which is the home device of the user. Other information may be used to select a transfer destination device. For example, information indicating the security level of each processing device 110 (such as the version of encryption software for generating an eDoc file and the key length of an encryption key) may also be used.

The exemplary embodiment has been discussed by way of example. The devices, such as the document creation terminal 102, the document access terminal 104, the processing device 110, the local user ID server 152, the local DID server 154, the local metadata server 156, the user ID server 210, the DID server 220, the metadata server 230, and the processing device management server 240 are implemented as a result of causing a computer to execute a program which describes the above-described functions of the devices. The computer has the following hardware circuit configuration. A microprocessor, such as a CPU, memory devices (primary storage devices), such as a random access memory (RAM) and a read only memory (ROM), a controller for controlling solid-state storage devices, such as a flash memory, a solid state drive (SSD), and a hard disk drive (HDD), various input-output (IO) interfaces, and a network interface for controlling connection with a network, such as a LAN, are connected to one another via a bus, for example. A program describing the processing content of the above-described functions is stored in a solid-state storage device, such as a flash memory, and is installed into the computer via a network. As a result of the microprocessor, such as a CPU, reading the program stored in the solid-state storage device into the RAM and executing the program, the above-described functional modules are implemented.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document management system comprising:
a management device; and
at least two processing devices, for each of the at least two processing devices, a user to be allowed to register a document by using a corresponding processing device being determined, the management device including
a first storage device that stores metadata of a protected document received from any of the at least two processing devices, and
a first processor configured for obtaining information concerning a processing load of each of the at least two processing devices,
the at least two processing devices including
first and second processing devices,
the first processing device including
a second storage device that stores information concerning a user to be allowed to register a document by using the first processing device,
a second processor configured for sending, upon receiving a request to register a document from the user, the document and identification information concerning the first processing device to the second processing device if a processing load of the first processing device is greater than a threshold, the second processing device being determined based on information concerning a processing load of one or more of the at least two processing devices obtained by the management device, and
configured for receiving a protected document which is sent from the second processing device based on the identification information, the protected document being generated by processing the document in the second processing device.

2. The document management system according to claim 1, wherein the second processing device does not send the protected document to the first processing device until the processing load of the first processing device becomes smaller than or equal to a second threshold.

3. The document management system according to claim 2, wherein, after sending the protected document to the first processing device, the second processing device deletes the protected document from a storage unit of the second processing device.

4. The document management system according to claim 1, wherein the second processing device includes a third processor configured for sending the protected document to a third processing device if the user has performed an operation for registering the document by using the third processing device and also configured for sending the protected document to the first processing device, the third processing device being a device different from the second processing device and being a device that the user is temporarily allowed to use.

5. The document management system according to claim 4, wherein, when the third processor has sent the protected document to the first processing device, the second processing device deletes the protected document from a storage unit of the second processing device, and the third processing device deletes the protected document from a storage unit of the third processing device.

6. The document management system according to claim 1, wherein the second processing device is determined, based on the information concerning the processing load, from among the processing devices having conversion software of the same version as the conversion software of the first processing device, the conversion software being used for converting the document into the protected document.

7. The document management system according to claim 1, wherein:
the request to register the document includes distribution receiver information indicating a distribution receiver of the protected document corresponding to the document;
the second processor of the first processing device sends the distribution receiver information to the second processing device, in addition to the document and the identification information concerning the first processing device; and
when the second processing device has generated the protected document, the second processing device sends a notification including document identification information for identifying the protected document to the distribution receiver indicated by the distribution receiver information.

* * * * *